United States Patent
Baek et al.

(10) Patent No.: US 9,623,874 B2
(45) Date of Patent: Apr. 18, 2017

(54) SYSTEM AND METHOD FOR MANAGING DANGEROUS DRIVING INDEX FOR VEHICLE

(71) Applicant: HYUNDAI MOBIS Co., Ltd, Seoul (KR)

(72) Inventors: Seung Heon Baek, Yongin-si (KR); Jun Han Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/735,528

(22) Filed: Jun. 10, 2015

(65) Prior Publication Data

US 2015/0360697 A1    Dec. 17, 2015

(30) Foreign Application Priority Data

Jun. 13, 2014 (KR) .......... 10-2014-0072280

(51) Int. Cl.
*G01C 22/00* (2006.01)
*G05D 1/00* (2006.01)
(Continued)

(52) U.S. Cl.
CPC ..... *B60W 40/09* (2013.01); *B60W 2050/0077* (2013.01); *B60W 2420/42* (2013.01);
(Continued)

(58) Field of Classification Search
CPC .......... B60W 30/18009; B60W 10/20; B60W 10/18; B60W 30/09; B60W 40/10;
(Continued)

(56) References Cited

U.S. PATENT DOCUMENTS 5,786,787 A    7/1998  Eriksson et al.
6,459,365 B2 * 10/2002 Tamura .............. G01C 21/3697
                                                340/425.5
(Continued)

FOREIGN PATENT DOCUMENTS

KR    1020050121571 A    12/2005
KR      20110037683 A     4/2011
(Continued)

*Primary Examiner* — Jelani Smith
*Assistant Examiner* — Luis A Martinez Borrero
(74) *Attorney, Agent, or Firm* — NSIP Law

(57) ABSTRACT

Provided are a system and method for managing dangerous driving index for vehicle. The system includes a driver's vehicle driving trajectory generator configured to generate a driver's vehicle driving trajectory, based on driver's vehicle driving information input from an internal sensor which senses a driving situation of the driver's vehicle, a peripheral vehicle trajectory generator configured to generate a peripheral vehicle trajectory, based on ambient environment information input from an external sensor which senses the driving situation of the driver's vehicle, a trajectory load calculator configured to calculate a trajectory load representing a comparison result which is obtained by comparing a predetermined threshold value with a trajectory distance which is a difference between the peripheral vehicle trajectory and the driver's vehicle driving trajectory, and a dangerous index manager configured to generate a dangerous driving index corresponding to the calculated trajectory load.

16 Claims, 19 Drawing Sheets

(51) Int. Cl.
*B60W 40/09* (2012.01)
*B60W 50/00* (2006.01)

(52) U.S. Cl.
CPC ..... *B60W 2420/52* (2013.01); *B60W 2420/54* (2013.01); *B60W 2520/10* (2013.01); *B60W 2520/14* (2013.01); *B60W 2540/18* (2013.01); *B60W 2550/10* (2013.01); *B60W 2550/308* (2013.01)

(58) Field of Classification Search
CPC ................ B60W 50/16; B60W 40/02; B60W 2050/0089; B60W 2420/54; B60W 2420/52; B60W 2040/0881; B60R 21/0134; B60R 2300/105; B60R 2021/01286; B60R 16/023; B60R 25/1004; G01C 21/3691; G01C 21/20; G01C 21/3469; G01C 21/3484; G01C 21/3697; G01C 21/3415; G01C 21/3655
USPC ....... 701/23, 1, 29.1, 72, 93, 400, 26, 25, 2, 701/117, 36, 96, 41, 70, 45, 533, 11, 120, 701/123
See application file for complete search history.

(56) References Cited

U.S. PATENT DOCUMENTS

| | | | | |
|---|---|---|---|---|
| 6,577,947 B1* | 6/2003 | Kronfeld | ................ | G01C 21/00 701/301 |
| 7,961,084 B2* | 6/2011 | Aso | ................ | G08G 1/161 340/435 |
| 8,209,090 B2* | 6/2012 | Arbitmann | ................ | B60W 10/06 701/300 |
| 8,401,782 B2* | 3/2013 | Eidehall | ................ | G01S 13/931 701/301 |
| 8,442,713 B2* | 5/2013 | Kim | ................ | G05D 1/0217 340/435 |
| 8,498,777 B2* | 7/2013 | Sanchez-Prieto Aler | ................ | B60W 40/10 340/988 |
| 8,515,659 B2* | 8/2013 | Kindo | ................ | G08G 1/167 701/300 |
| 8,571,786 B2* | 10/2013 | Iwasaki | ................ | B60W 10/06 340/435 |
| 8,849,512 B2* | 9/2014 | Filev | ................ | B60W 50/087 701/36 |
| 9,109,906 B2* | 8/2015 | Sakai | ................ | B60W 30/09 |
| 9,129,519 B2* | 9/2015 | Aoude | ................ | G08G 1/00 |
| 9,220,454 B2* | 12/2015 | Nilsson | ................ | A61B 5/18 |
| 2004/0090117 A1* | 5/2004 | Dudeck | ................ | B60T 7/22 303/191 |
| 2005/0065711 A1* | 3/2005 | Dahlgren | ................ | G01C 21/26 701/117 |
| 2006/0058964 A1* | 3/2006 | Lucas | ................ | B60R 21/0134 701/301 |
| 2009/0040054 A1* | 2/2009 | Wang | ................ | B60W 30/095 340/576 |
| 2009/0234552 A1* | 9/2009 | Takeda | ................ | B60W 30/16 701/96 |
| 2012/0206597 A1* | 8/2012 | Komoto | ................ | G06T 7/2006 348/135 |
| 2013/0302758 A1* | 11/2013 | Wright | ................ | G07C 5/008 434/65 |
| 2014/0019167 A1* | 1/2014 | Cheng | ................ | G06Q 40/08 705/4 |
| 2014/0162219 A1* | 6/2014 | Stankoulov | ................ | G09B 19/167 434/65 |
| 2014/0188343 A1* | 7/2014 | Yoshimura | ................ | B60K 6/46 701/41 |
| 2014/0236414 A1* | 8/2014 | Droz | ................ | B60W 30/00 701/28 |
| 2014/0303833 A1* | 10/2014 | Phelan | ................ | G06Q 40/00 701/31.5 |
| 2014/0309849 A1* | 10/2014 | Ricci | ................ | B60Q 1/00 701/33.4 |
| 2015/0019266 A1* | 1/2015 | Stempora | ................ | G06Q 40/08 705/4 |
| 2015/0025789 A1* | 1/2015 | Einecke | ................ | G01S 13/72 701/408 |
| 2015/0025917 A1* | 1/2015 | Stempora | ................ | G06Q 40/08 705/4 |
| 2015/0088397 A1* | 3/2015 | Burton | ................ | A61B 5/18 701/70 |
| 2015/0224998 A1* | 8/2015 | Prakah-Asante | ................ | B60W 50/12 701/36 |
| 2015/0239478 A1* | 8/2015 | Dorum | ................ | G01C 21/32 701/29.1 |
| 2015/0266484 A1* | 9/2015 | Moran | ................ | B60W 40/08 340/576 |
| 2015/0266485 A1* | 9/2015 | Prakah-Asante | ................ | B60W 40/09 701/1 |
| 2015/0360698 A1* | 12/2015 | Beyene | ................ | B60W 40/09 701/41 |
| 2015/0375756 A1* | 12/2015 | Do | ................ | B60W 50/14 701/1 |
| 2016/0001781 A1* | 1/2016 | Fung | ................ | G06F 19/345 701/36 |
| 2016/0009295 A1* | 1/2016 | Chun | ................ | A61B 5/6893 701/32.9 |
| 2016/0023666 A1* | 1/2016 | Lee | ................ | B60W 50/14 701/33.4 |
| 2016/0039430 A1* | 2/2016 | Ricci | ................ | H04W 48/04 701/36 |
| 2016/0101785 A1* | 4/2016 | Takahashi | ................ | B60K 35/00 701/31.4 |
| 2016/0110650 A1* | 4/2016 | Basir | ................ | B60W 40/09 706/14 |
| 2016/0129914 A1* | 5/2016 | Phelan | ................ | G06Q 40/00 701/70 |

FOREIGN PATENT DOCUMENTS

| | | |
|---|---|---|
| KR | 20110104682 A | 9/2011 |
| KR | 20120022305 A | 3/2012 |
| KR | 20140031435 A | 3/2014 |

* cited by examiner

FACE ANGLE OF DRIVER($\alpha$)

PUPIL POSITION OF DRIVER($\beta$)

(A)　　　　　　　　　　(B)

SYSTEM AND METHOD FOR MANAGING DANGEROUS DRIVING INDEX FOR VEHICLE

CROSS-REFERENCE TO RELATED APPLICATIONS

This application claims priority under 35 U.S.C. §119 to Korean Patent Application No. 10-2014-0072280, filed on Jun. 13, 2014, the disclosure of which is incorporated herein by reference in its entirety.

TECHNICAL FIELD

The present invention relates to a system for managing a dangerous driving index for vehicles, and more particularly, to a system for managing a dangerous driving index for vehicles, which manages a dangerous driving index generated based on information measured from a vehicle.

BACKGROUND

Generally, an autonomous driving control system for enhancing the protection of a driver or a passenger, driving assistance, and a comfortable ride is equipped in vehicles. The autonomous driving control system recognizes a lane by using a camera and automatically controls the steering of a vehicle, based on a result of the recognition.

With regard to the autonomous driving control system, autonomous driving technology where a driving characteristic of a driver is reflected in a path search and a driving operation is disclosed in a prior art reference (for example, Korean Patent Publication No. 10-2012-0022305).

An autonomous vehicle disclosed in the prior art reference (for example, Korean Patent Publication No. 10-2012-0022305) includes: an image photographing unit that acquires image information about a road around a vehicle; a receiver that receives path information transmitted from a peripheral vehicle around the vehicle; a memory that stores a past driving pattern of the vehicle; and a controller that determines a driving pattern of the vehicle, based on image information about the road, path information transmitted from the peripheral vehicle, and the past driving pattern of the vehicle. The autonomous vehicle learns a driver's characteristic and controls the autonomous driving of the vehicle.

In the prior art reference (for example, Korean Patent Publication No. 10-2012-0022305), the autonomous vehicle collects past driving pattern for checking a driving habit (a past driving pattern) of a driver. In this case, when past driving data different actual driving data is abnormally collected due to a sudden situation, the autonomous driving of a vehicle based on the abnormally collected past driving data provides the driver with larger repulsion than general autonomous driving.

Therefore, with regard to the autonomous driving of a vehicle, it is required to develop a system in which an accurate driving habit of a driver is reflected.

SUMMARY

Accordingly, the present invention provides a system and method for managing a dangerous driving index for vehicles, in which an accurate driving habit of a driver is reflected.

In one general aspect, a system for managing dangerous driving index for vehicle includes: a driver's vehicle driving trajectory generator configured to generate a driver's vehicle driving trajectory, based on driver's vehicle driving information input from an internal sensor which senses a driving situation of the driver's vehicle; a peripheral vehicle trajectory generator configured to generate a peripheral vehicle trajectory, based on ambient environment information input from an external sensor which senses the driving situation of the driver's vehicle; a trajectory load calculator configured to calculate a trajectory load representing a comparison result which is obtained by comparing a predetermined threshold value with a trajectory distance which is a difference between the peripheral vehicle trajectory and the driver's vehicle driving trajectory; and a dangerous index manager configured to generate a dangerous driving index corresponding to the calculated trajectory load.

In another general aspect, a method for managing dangerous driving index for vehicle includes: generating a driver's vehicle driving trajectory, based on driver's vehicle driving information input from an internal sensor which senses a driving situation of the driver's vehicle; generating a peripheral vehicle trajectory, based on ambient environment information input from an external sensor which senses the driving situation of the driver's vehicle; calculating a trajectory load representing a comparison result which is obtained by comparing a predetermined threshold value with a trajectory distance which is a difference between the peripheral vehicle trajectory and the driver's vehicle driving trajectory; and generating a dangerous driving index corresponding to the calculated trajectory load.

Other features and aspects will be apparent from the following detailed description, the drawings, and the claims.

DETAILED DESCRIPTION OF EMBODIMENTS

Figure 1:
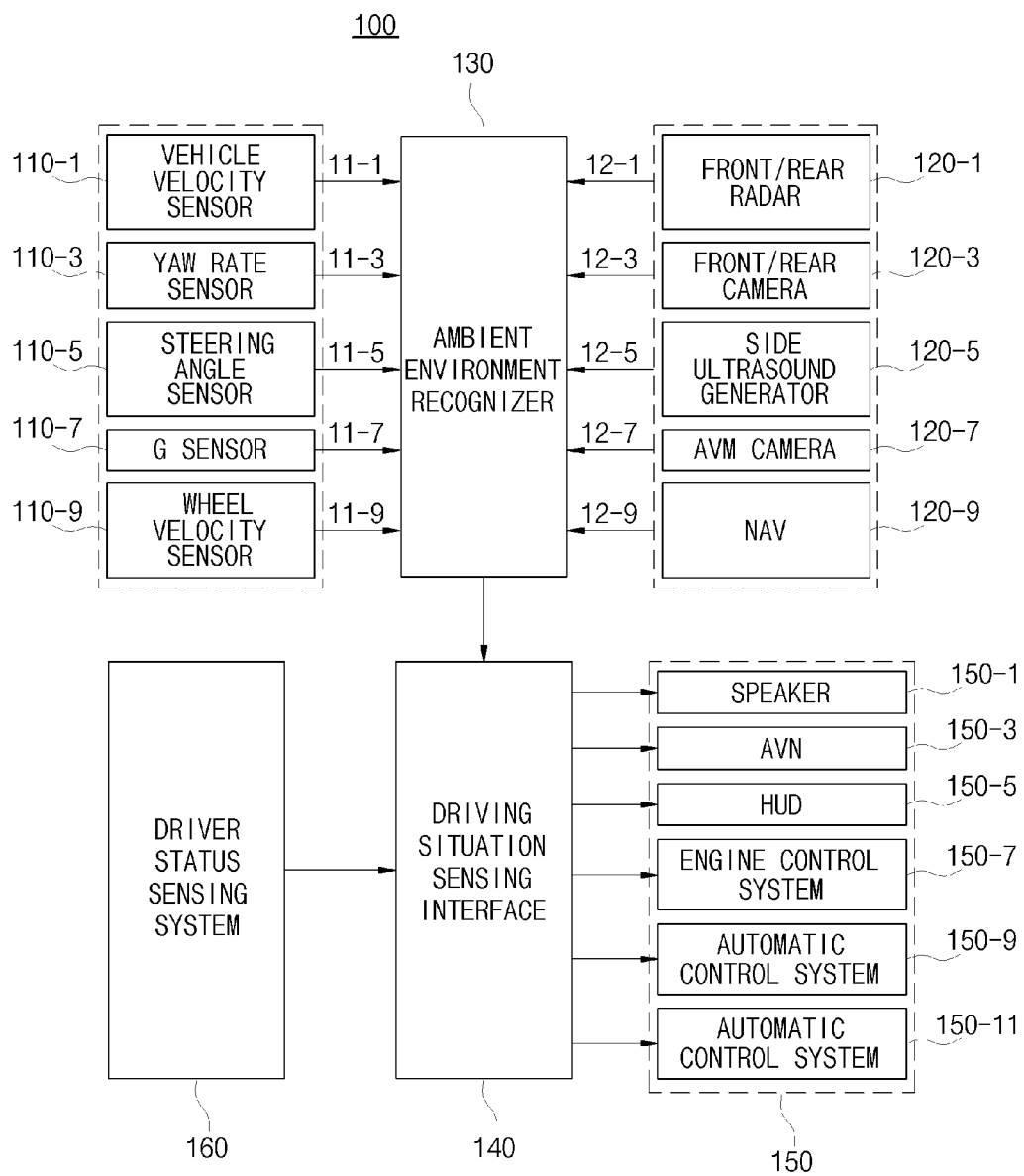
FIG. 1 is a block diagram illustrating a system for managing a dangerous driving index for vehicles, according to an embodiment of the present invention.

Hereinafter, exemplary embodiments of the present invention will be described in detail with reference to the accompanying drawings. In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present invention.

FIG. 1 is a block diagram illustrating a system 100 for managing a dangerous driving index for vehicles, according to an embodiment of the present invention.

Referring to FIG. 1, the system 100 for managing the dangerous driving index may not analyze a driving habit of a driver from a previously learned past driving pattern but may accurately analyze a driving habit, based on information which is acquired through various sensors in real time.

The system 100 for managing the dangerous driving index according to an embodiment of the present invention may use the information which is acquired through the various sensors in real time, and thus more accurately analyzes a driving habit of a driver than a related art driving habit analysis method which analyzes a driving habit from a learned past driving pattern.

The system 100 for managing the dangerous driving index may include an internal sensor 110, an external sensor 120, an ambient environment recognizer 130, a driving situation sensing interface 140, a driver status sensing system 160, and an output unit 150.

The internal sensor 110 may sense a driving situation of a driver's vehicle to acquire driver's vehicle driving information. The driver's vehicle driving information may include vehicle velocity information 11-1, yaw rate information 11-3, steering angle information 11-5, acceleration information 11-7, and wheel velocity information 11-9.

In order to acquire the driver's vehicle driving information, the internal sensor 110 may include a vehicle velocity sensor 110-1 that acquires the vehicle velocity information 11-1, a yaw rate sensor 110-3 that acquires the yaw rate information 11-3, a steering angle sensor 110-5 that acquires the steering angle information 11-5, and a wheel velocity sensor 110-9 that acquires the wheel velocity information 11-9.

The external sensor 120 may sense an ambient situation of the driver's vehicle to acquire ambient environment information. The ambient environment information may include front/rear radar information 12-1, front/rear image information 12-3, side ultrasound information 12-5, around view monitoring (AVM) image information 12-7, and navigation information 12-9.

In order to acquire the ambient environment information, the external sensor 120 may include a front/rear radar 120-1 that acquires the front/rear radar information 12-1, a front/rear camera 120-3 that acquires the front/rear image information 12-3, a side ultrasound generator 120-5 that acquires the side ultrasound information 12-5, an AVM camera 120-7 that acquires the AVM image information 12-7, a navigation (NAV) 120-9 that acquires the navigation information 12-9, a vehicle-to-infrastructure communication system and a vehicle-to-vehicle communication system. A vehicle-to-infrastructure communication system and a vehicle-to-vehicle communication system may include information, for example, about traffic control feature (e.g., stop lights, stop signs), current weather related information, information relating to transient anomalies transient anomalies and transient anomaly locations (e.g., construction zones, temporary speed limits, incident scenes (e.g., accident scenes, roadblocks, and so on), other vehicle's location, other vehicle's route (e.g., starting point, destination, expected trajectory), lane status, and cut in sign(e.g., turn signal). The lane status (information) can be one-lane county road, divided highway, boulevard, multi-lane road, one-way road, two-way road, or city street. Any variations of the above teachings are also intended to be covered by this patent application.

The ambient environment recognizer 130 may calculate a trajectory load by using the driver's vehicle driving information supplied from the internal sensor 110 and the ambient environment information supplied from the external sensor 120, and may manage a dangerous driving index, based on a result of the calculation. This will be described below in detail with reference to FIG. 2.

The driving situation sensing interface 140 may interface the output unit 150 and provide a driver with driver status information supplied from the driver status sensing system 160 and the dangerous driving index, supplied from the ambient environment recognizer 130, through the output unit 1150.

The output unit 150 may output the dangerous driving index, reflected in the driving status information, in a visual or acoustical information form to provide the dangerous driving index to the driver. To this end, the output unit 150 may include a speaker 150-1, an audio video navigation (AVN) 150-3, and a head up display 150-5.

Moreover, the output unit 150 may further include an engine control system 150-7, an automatic control system 150-9, and a steering control system 150-11, for adjusting a timing when the lateral control of the vehicle starts.

The driver status sensing system 160 may sense a driving status such as drowsy driving, etc. The driver status sensing system 160 will be described below in detail with reference to FIGS. 10 to 17.

Figure 2:
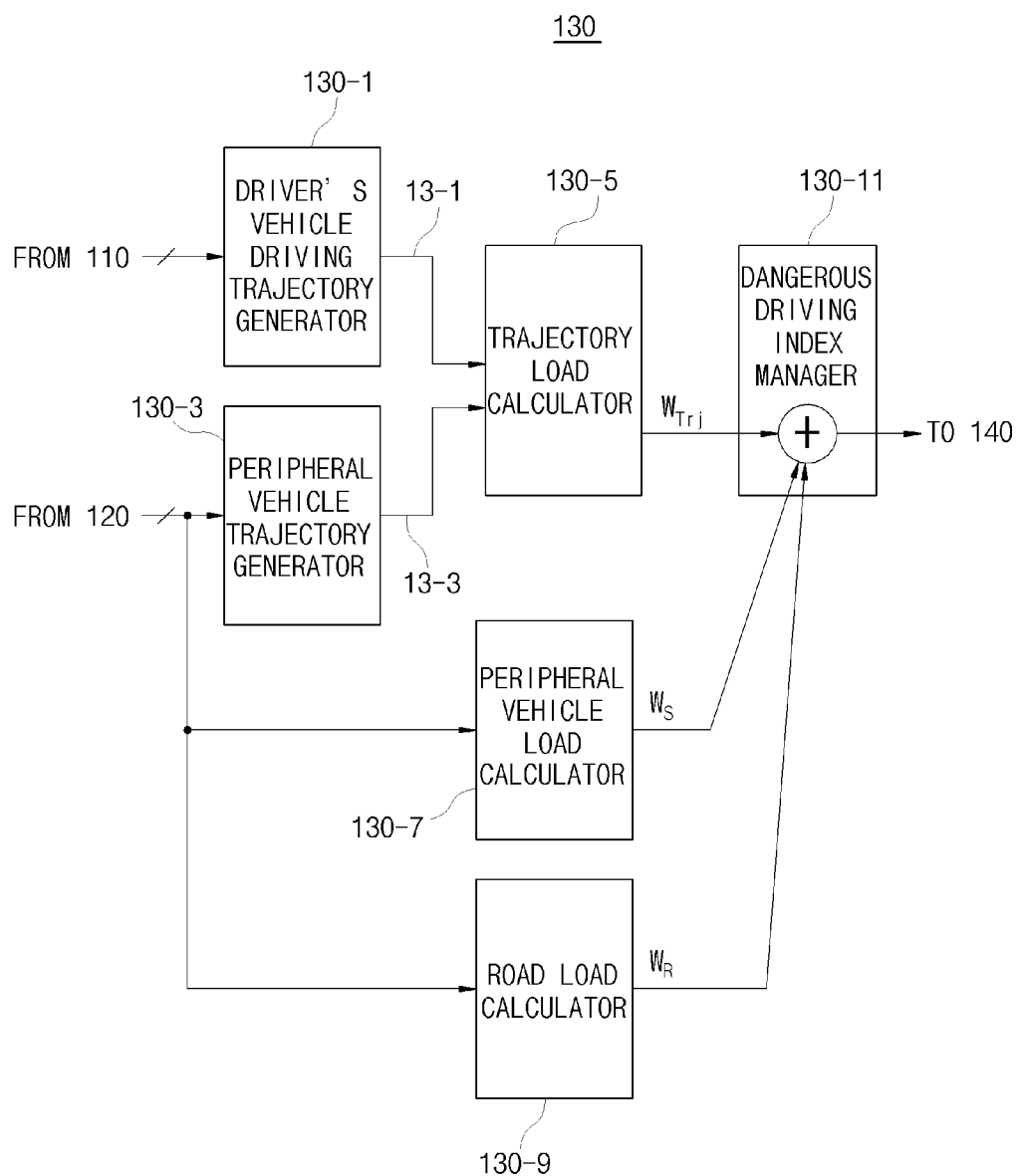
FIG. 2 is a block diagram illustrating a detailed configuration of an ambient environment recognizer illustrated in FIG. 1.

FIG. 2 is a block diagram illustrating a detailed configuration of the ambient environment recognizer 130 illustrated in FIG. 1.

Referring to FIG. 2, as described above, the ambient environment recognizer 130 may calculate the trajectory load by using the driver's vehicle driving information supplied from the internal sensor 110 and the ambient environment information supplied from the external sensor 120, and calculate the dangerous driving index (or a peripheral risk index), based on the calculated trajectory load.

In order to more accurately manage the dangerous driving index, the ambient environment recognizer 130 may calculate the dangerous driving index in further consideration of a peripheral vehicle load and a road load in addition to the trajectory load.

The ambient environment recognizer 130 may include a driver's vehicle driving trajectory generator 130-1, a peripheral vehicle trajectory generator 130-3, a trajectory load calculator 130-5, a peripheral vehicle load calculator 130-7, a road load calculator 130-9, and a dangerous driving index manager 130-11.

The driver's vehicle driving trajectory generator 130-1 may acquire a driver's vehicle driving trajectory 130-1 by using vehicle velocity information, steering angle information, reduction/acceleration information, and yaw rate information supplied from the internal sensor 110.

The peripheral vehicle trajectory generator 130-3 may acquire a peripheral vehicle driving trajectory 13-3 by using the ambient environment information which includes the front/rear radar information 12-1, the front/rear image information 12-3, the side ultrasound information 12-5, and the AVM image information 12-7 supplied from the external sensor 120.

The front/rear radar information 12-1 is low in accuracy of determining an object, but enables accurate distance information (a longitudinal direction) to be obtained. On the other hand, since the image information 12-3 and 12-7 are used to acquire a monocular image, the image information 12-3 and 12-7 are low in accuracy of the distance information (the longitudinal direction), but the image information 12-3 and 12-7 enable an object to be accurately determined and enable lateral information to be obtained.

In a target vehicle model equation, the longitudinal distance information may be acquired by using the front/rear radar 120-1, and the lateral distance information may be acquired by using the front/rear camera 120-3, the AVM camera 120-7, and the side ultrasound generator 120-5.

The following Equation (1) may be the target vehicle module equation which is used by the peripheral vehicle trajectory generator 130-3, for predicting a peripheral vehicle trajectory.

$$A = \begin{bmatrix} 1 & \Delta t & 0 & 0 \\ 0 & 1 & 0 & 0 \\ 0 & 0 & 1 & \Delta t \\ 0 & 0 & 0 & 1 \end{bmatrix}, H = \begin{bmatrix} 1 & 0 & 0 & 0 \\ 0 & 0 & 1 & 0 \end{bmatrix} \quad (1)$$

$$x = \begin{bmatrix} x \\ v_x \\ y \\ v_y \end{bmatrix} \quad \begin{array}{l} x_k = Ax_k + w_k \\ z_k = Hx_k + v_k \end{array}$$

where x, $V_x$, y, and $V_y$ denote status variables of a target vehicle, and x and y denote a position of the target vehicle and are measured by an image camera. $V_x$ and $V_y$ denote a velocity of the target vehicle. A denotes a vehicle model equation, H denotes a measurement value model equation, and the status variables respectively denote a distance and a velocity in an x axis direction and a distance and a velocity in a y axis direction. A system noise and a measurement value noise denote white Gaussian.

The trajectory load calculator 130-5 may calculate a trajectory load "$W_{Trj}$". The trajectory load "$W_{Trj}$" may be a comparison result which is obtained by comparing a predetermined threshold value with a trajectory distance value which is a difference between the peripheral vehicle trajectory 13-3 and the driver's vehicle driving trajectory 13-1.

The driver's vehicle driving trajectory 13-1 and the peripheral vehicle trajectory 13-3 may be predicted, and a situation where there is a risk of collision may be a situation where a high caution of the driver is required. The trajectory load calculator 130-5 may digitize the situation as the trajectory load "$W_{Trj}$".

The trajectory load "$W_{Trj}$" may be calculated as expressed in the following Equation (2):

$$W_{Trj}(i) = |T_{Trj}(i) - D_{Trj}(i)| \text{ if } W_{Trj}(i) > \text{Threshold}, 0$$

$$W_{Trj}(i) < \text{Threshold}, 1 \quad (2)$$

where $D_{Trj}$ denotes a driver's vehicle driving trajectory, and $T_{Trj}$ denotes a peripheral vehicle trajectory. Also, i (1, 2, . . . , n) denotes a detected peripheral vehicle.

According to Equation (1), trajectories of detected peripheral vehicles may be compared with a trajectory of the driver's vehicle, and when a trajectory distance is less than a threshold value, the trajectory load "$W_{Trj}$" may be set to 1. Also, when the trajectory distance is greater than the threshold value, the trajectory load "$W_{Trj}$" may be set to 0.

The peripheral vehicle load calculator 130-7 may analyze the number of front/rear/side peripheral vehicles and whether the peripheral vehicles change lanes, based on the ambient environment information and may calculate a peripheral vehicle load "$W_S$", based on a result of the analysis. The number of the peripheral vehicles and a trajectory change of each of the peripheral vehicles may act as a load requiring a caution of the driver.

Figure 3:
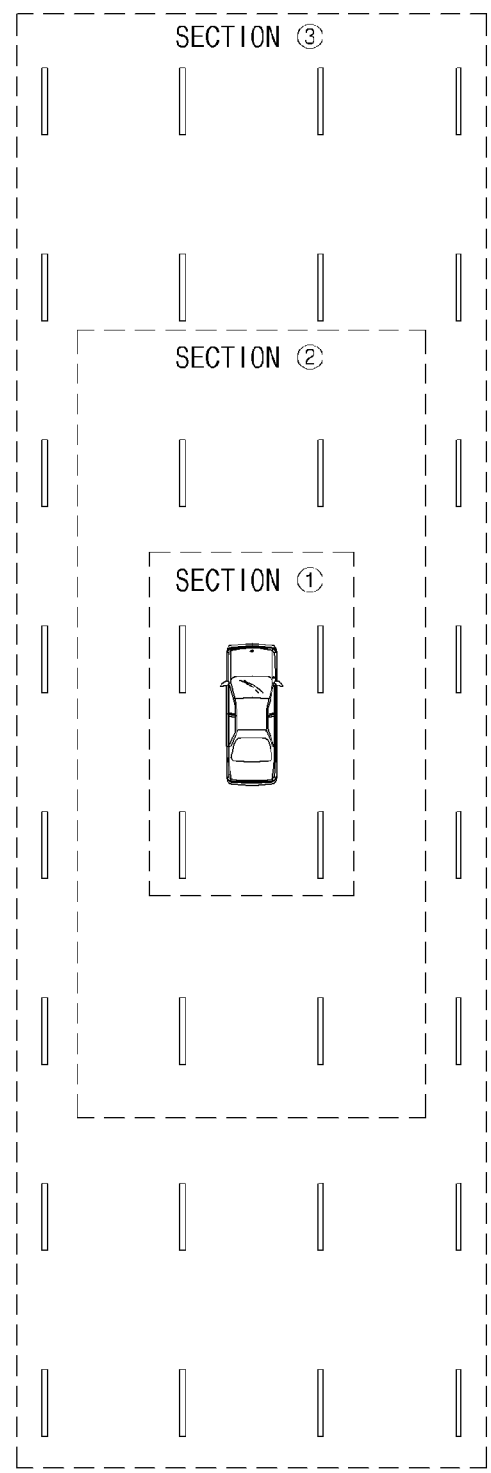
FIG. 3 is a diagram schematically illustrating three dangerous sections which are divided by a peripheral vehicle load calculator of FIG. 2, based on a time to collision (TTC)

In order to calculate the peripheral vehicle load, three dangerous sections ①, ② and ③ may be calculated based on a time to collision (TTC). The three dangerous sections ①, ② and ③ are illustrated in FIG. 3. Here, the TTC may be defined as a time which is taken until a corresponding vehicle collides with a target vehicle when a closing velocity of a vehicle is constant. The TTC may be calculated, based on the vehicle velocity information 11-1 and the steering angle information 11-5.

Figure 4:
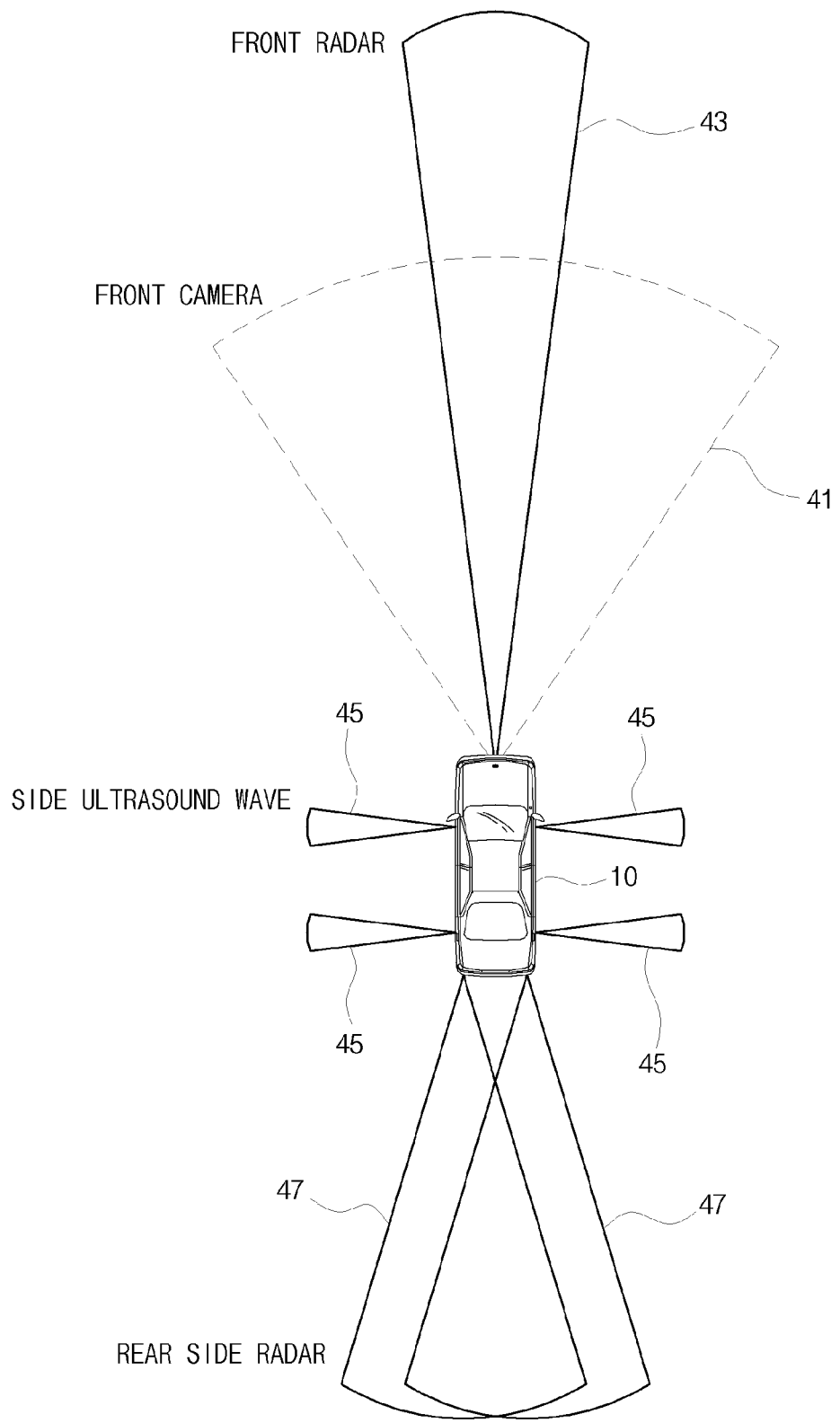
FIG. 4 is a diagram illustrating a configuration of a sensor for detecting peripheral vehicles located in each of the dangerous sections of FIG. 3.
Figure 5:
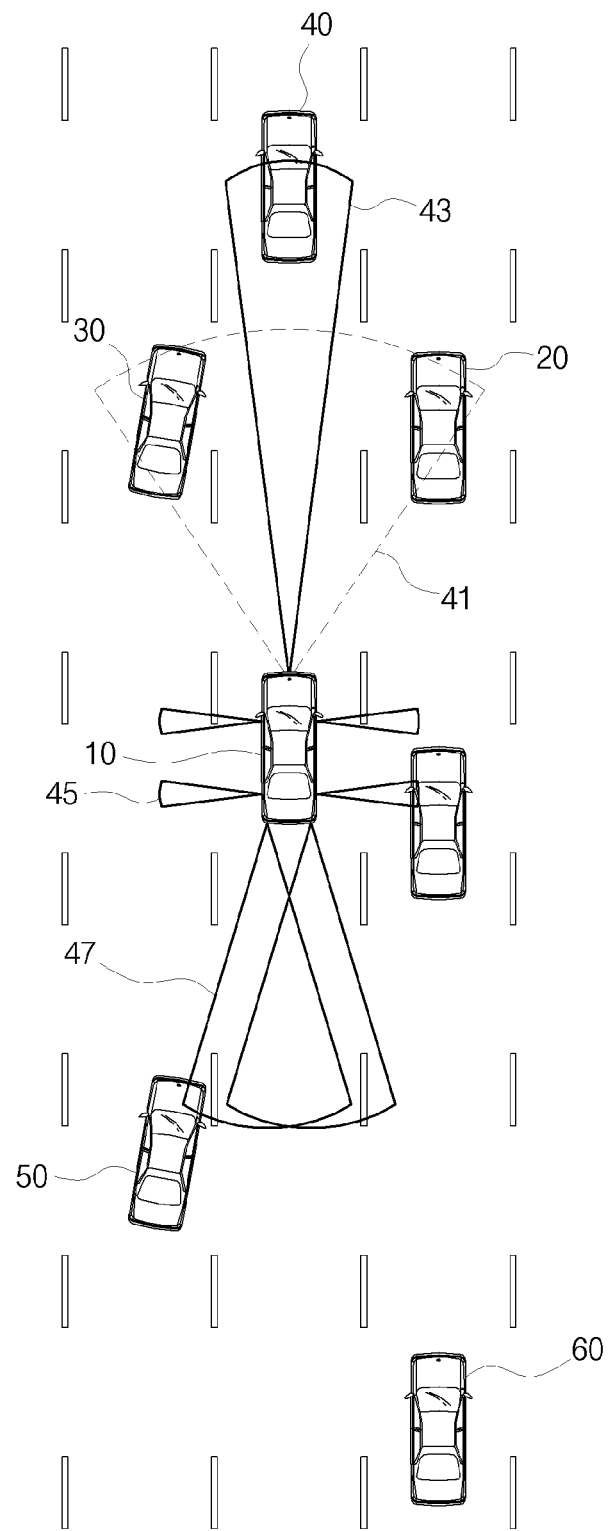
FIG. 5 is a diagram illustrating an example of detecting peripheral vehicles by using the sensor illustrated in FIG. 4.

For example, as illustrated in FIGS. 4 and 5, the three dangerous sections ①, ② and ③ may be set by calculating a time which is obtained by a relative velocity value of a detected vehicle by a TTC value for each of peripheral vehicles (20, 30, 40 and 50 in FIG. 5) which are detected from detection sections 43 and 47 detected by the front/rear radar 120-1, detection sections detected by the front/rear camera 120-3, and a detection section 45 detected by the side ultrasound generator 120-5.

When the three dangerous sections ①, ② and ③ are set, the peripheral vehicle load calculator 130-7 may analyze the number of peripheral vehicles detected from the sections and whether the peripheral vehicles change lanes, and calculate the peripheral vehicle load "$W_S$", based on a result of the analysis.

As the number of vehicles detected from the section ① increases and as the number of times the detected vehicles change lanes increases, the peripheral vehicle load "$W_S$" may increase. On the other hand, when there is no detected peripheral vehicle, or although there is a detected peripheral vehicle, the peripheral vehicle is detected from the section ③ or a trajectory change of the peripheral vehicle detected from the section ③ is not severe, the peripheral vehicle load "$W_S$" may decrease.

The peripheral vehicle load "$W_S$" may be expressed as the following Equation (3):

$$W_S = \alpha \sum_{i=1}^{n} S_i + \beta \sum_{i=1}^{n} L_i \qquad (3)$$

where α denotes a weighting factor, β denotes a weighting factor, S denotes a position (the section ①, ② or ③) of a detected peripheral vehicle, and L denotes whether the detected peripheral vehicle changes a lane. When the detected peripheral vehicle has changed a lane, L may be set to 1, and when a lane is not changed, L may be set to 0. i (1<i<n, where n is a natural number) denotes a detected peripheral vehicle.

The road load calculator 130-9 may calculate a road load by using a road shape, a road surface status, and a traffic status which are included in the ambient environment information. For example, a short distance road load may be calculated by using image information obtained from an ultrasound apparatus, a radar, and/or a lidar among external sensors, and a long distance road load may be calculated by using vehicle-to-vehicle and vehicle-to-infrastructure among external sensors.

A caution of a driver is more required in a curve road than a straight road and in a crossroad than a general road, and as a front traffic situation becomes worse, a caution of the driver is required. Therefore, it is required to calculate the road load.

The road load may be calculated based on the navigation information 12-9, which is supplied from the navigation 120-9 and includes road status information, and road surface status information acquired from the front/rear camera 120-3. The road load may be calculated as expressed in the following Equation (4):

$$W_R = \alpha \times A + \beta \times B + \gamma \times C \qquad (4)$$

where A denotes a value representing a road status. For example, as a curvature value of a front road increases, A may have a large value, and when traffic lights are changed, there is a pedestrian, a velocity is limited, or a current zone is a children protection zone, A may have a large value. B denotes a road surface status value, and a paved road and an unpaved road may be reflected in B. C denotes traffic of a front road, and as traffic increases, C may have a large value. A, B, and C may be all normalized to a range of 0 to 5.

The dangerous driving index manager 130-11 may manage the dangerous driving index (the peripheral risk index) obtained by summating the plurality of loads "$W_{Trj}$", "$W_S$" and "$W_R$" which are calculated in respective steps.

The dangerous driving index manager 130-11 may summate the trajectory load "$W_{Trj}$", the peripheral vehicle load "$W_S$", and the road load "$W_R$" to calculate a summating result value as the dangerous driving index.

When the calculated dangerous driving index is higher than a predetermined threshold value, the dangerous driving index manager 130-11 may supply the calculated dangerous driving index to the vehicle control systems 150-7, 150-9 and 150-11 through the driving situation sensing interface 140.

The vehicle control systems 150-7, 150-9 and 150-11, which have received the calculated dangerous driving index higher than the predetermined threshold value, may control an engine operation, a braking operation, and a steering operation to restrict a driving function of the vehicle.

The dangerous driving index may be expressed as the following Equation (5):

$$\text{Dangerous Driving Index} = W_{Trj} + W_S + W_R \qquad (5)$$

Figure 6:
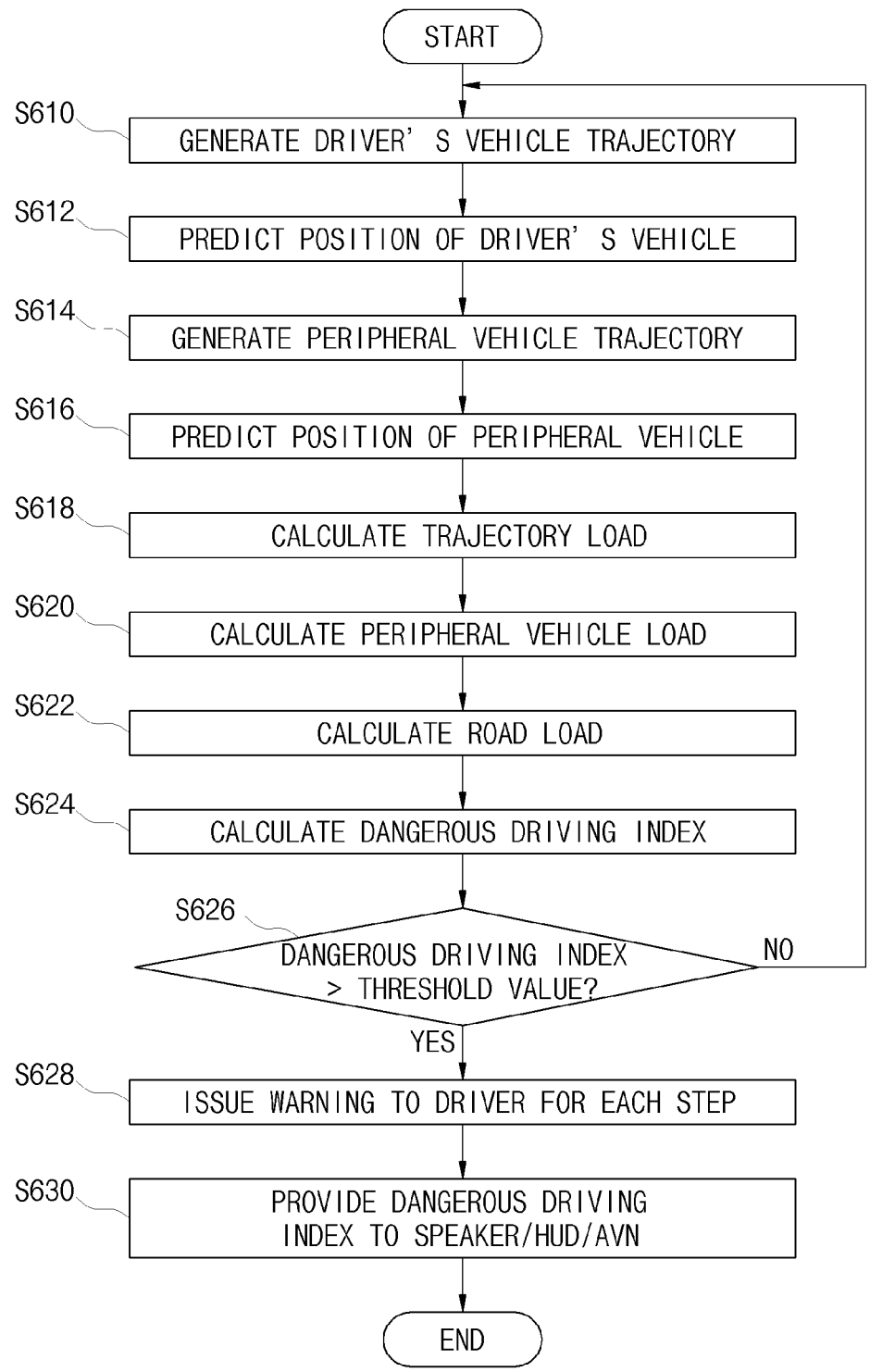
FIG. 6 is a flowchart illustrating a method of managing a dangerous driving index for vehicles, according to an embodiment of the present invention.

FIG. 6 is a flowchart illustrating a method of managing a dangerous driving index for vehicles, according to an embodiment of the present invention.

Referring to FIG. 6, in step 610, an operation of generating a driver's vehicle driving trajectory may be performed, and in step S612, an operation of predicting a position of the driver's vehicle by using the generated driver's vehicle driving trajectory may be performed. The driver's vehicle driving trajectory may be generated based on vehicle velocity information, steering angle information, reduction/acceleration information, and yaw rate information.

Subsequently, in step S614, an operation of generating a peripheral vehicle driving trajectory may be performed, and in step S616, an operation of predicting a position of a peripheral vehicle may be performed. The peripheral vehicle driving trajectory may be generated based on longitudinal distance information acquired from a radar, lateral distance information acquired from a camera, and lateral distance information acquired from an ultrasound generator. Here, the longitudinal distance information may be longitudinal distance information to the peripheral vehicle with respect to the driver's vehicle, and the longitudinal distance information may be longitudinal distance information to the peripheral vehicle with respect to the driver's vehicle.

Subsequently, in step S618, an operation of calculating a trajectory load may be performed. The trajectory load may be calculated based on the driver's vehicle driving trajectory and the peripheral vehicle driving trajectory. For example, driving trajectories of detected peripheral vehicles may be compared with the driver's vehicle driving trajectory, and when a trajectory distance which is a difference therebetween is less than a threshold value, the trajectory load may be calculated as 1. On the other hand, when the trajectory distance is greater than the threshold value, the trajectory load may be calculated as 0.

Subsequently, in step S620, an operation of calculating a peripheral vehicle load may be performed. The peripheral vehicle load may be calculated in consideration of the number of vehicles, located in each of a plurality of dangerous sections which are divided based on a TTC, and whether the vehicles change lanes. The peripheral vehicles located in the plurality of dangerous sections may be detected by using a radar, a camera, and an ultrasound generator, and the plurality of dangerous sections may be obtained by calculating a time which is obtained by dividing a relative velocity value by a relative distance (which is a TTC value) to a detected vehicle.

Subsequently, in step S622, an operation of calculating a road load may be performed. The road load may be calculated based on navigation information, road surface status information, traffic information, etc.

Subsequently, in step S624, an operation of calculating a dangerous driving index may be performed. The dangerous driving index may be calculated by summating the trajectory load, the peripheral vehicle load, and the road load.

Subsequently, in step S626, an operation of comparing the calculated dangerous driving index with a threshold value may be performed. When the dangerous driving index is equal to or greater than the threshold value, the system 100 may warn the driver of a dangerous driving situation by steps, based on a level of the threshold value in step S628. Here, when the dangerous driving index is less than the threshold value, steps S610 to S624 may be again performed.

In step S630, an operation of providing the dangerous driving index indicating the dangerous driving situation to the driver through a speaker, a HUD, and an AVN equipped in the vehicle may be performed.

Figure 7:
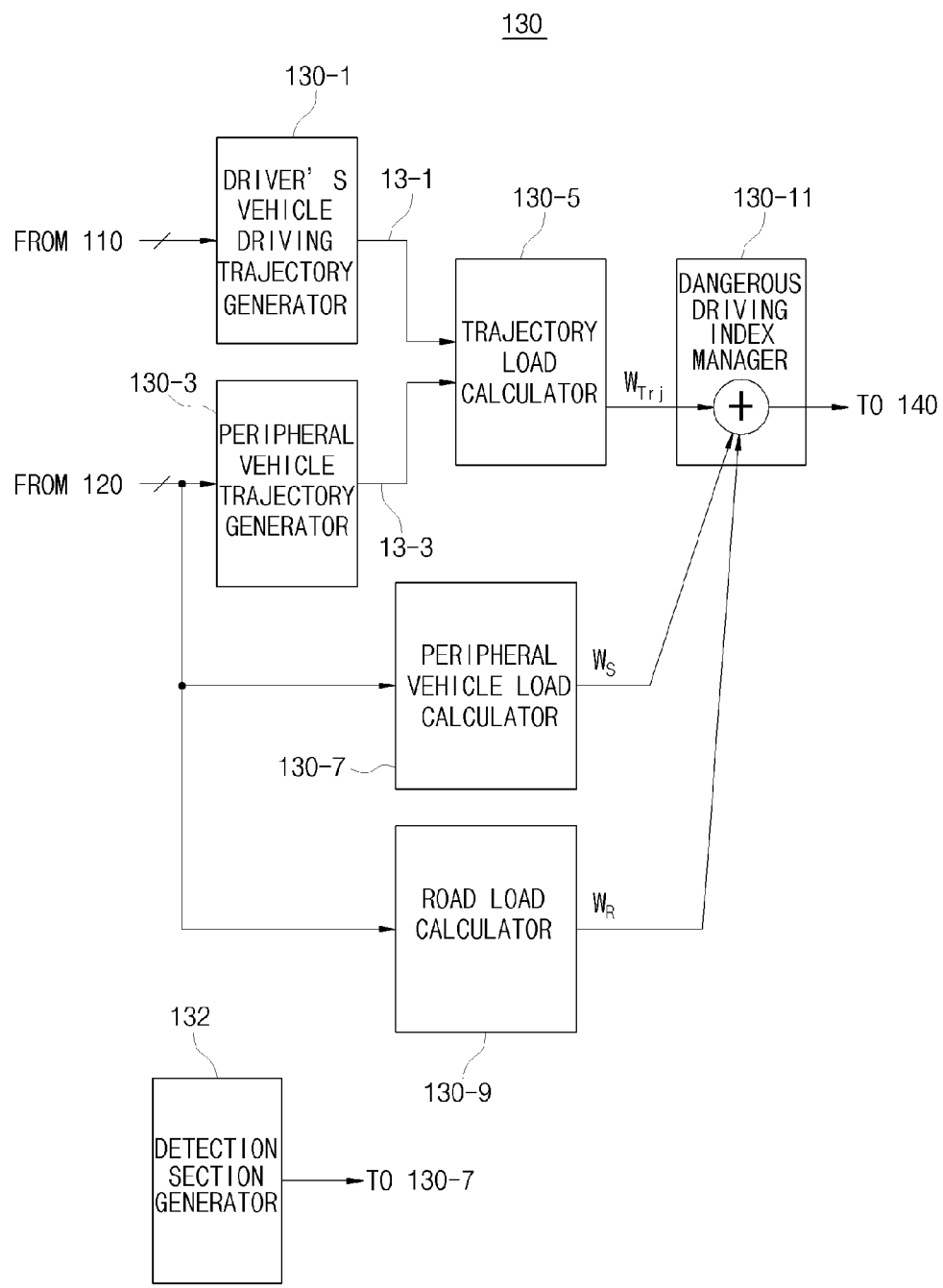
FIG. 7 is a block diagram for describing another embodiment of the ambient environment recognizer illustrated in FIG. 2.

FIG. 7 is a block diagram for describing another embodiment of the ambient environment recognizer illustrated in FIG. 2.

Referring to FIG. 7, an ambient environment recognizer 130 according to another embodiment of the present invention may include a detection section generator 132 for detecting an optimized section region (hereinafter referred to as a detection section) and recognizing an ambient environment in the optimized detection section. Other elements except the detection section generator 132 are the same as the elements included in the ambient environment recognizer 130 of FIG. 2, and thus, the details of the ambient environment recognizer 130 described above with reference to FIG. 2 may be applied to the other elements.

The detection section generator 132 may optimize a detection section including a target object so as to accurately distinguish an actual obstacle among target objects around a vehicle.

Figure 8:
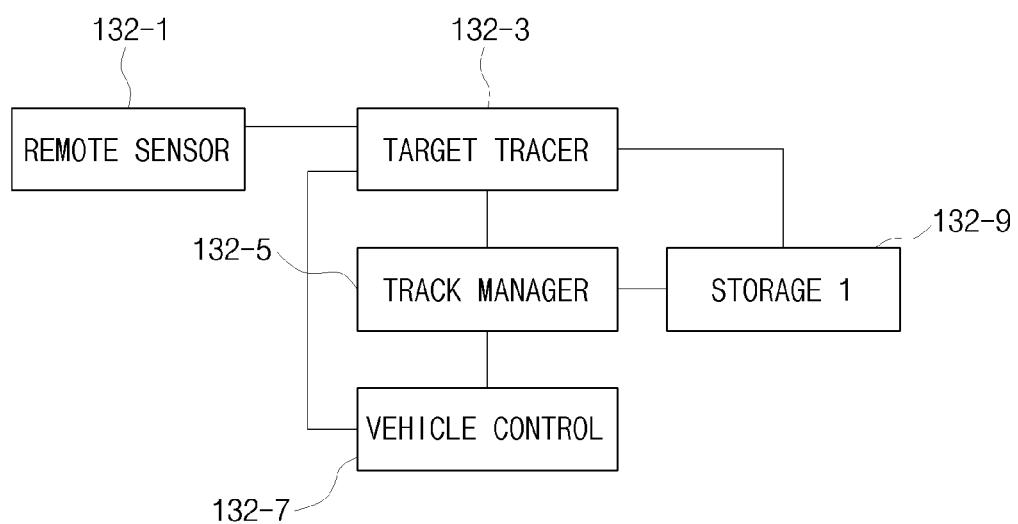
FIG. 8 is a block diagram illustrating a detailed configuration of a detection section generator illustrated in FIG. 7.

FIG. 8 is a block diagram illustrating a detailed configuration of the detection section generator 132 illustrated in FIG. 7.

As illustrated in FIG. 8, the detection section generator 132 for optimizing a detection section according to an embodiment of the present invention may include a remote sensor 132-1, a target tracer 132-3, a track manager 132-5, and a storage 132-9.

The remote sensor 132-1 may detect a position of an object around a vehicle to output a detection signal. In this case, the remote sensor 132-1 may include one or more of a lidar sensor, a radar sensor, and a camera sensor.

The target tracer 132-3 may distinguish an obstacle, based on the detection signal and generate a track which includes a covariance of an error and a position estimation value corresponding to the distinguished obstacle, thereby tracing the position.

Generally, a Kalman filter may be used for overcoming an error of a sensor and sensing a position of a moving object.

The Kalman filter may use a technique that repeats an operation of calculating an estimation value of a position of an object, based on an estimation value of a position of the object at a previous time and a measurement value of a position of the object and thus counteracts an error which occurs in measuring the position of the object, thereby estimating an accurate position of the object. In this case, an estimation value at a current time which is based on only a measurement value to a previous time may be calculated based on an estimation value of a position of an object to the previous time.

Subsequently, an estimation value at a current time which is based on only a measurement value to a previous time may be corrected based on a covariance at the current time, which is calculated based on only the measurement value to the previous time, and a measurement value of a position of an object at the current time, and an estimation value of the position of the object at the current time may be calculated.

The target tracer 132-3 may set the number of tracks and a detection section and an initial position of an obstacle corresponding to each of the tracks, based on the position of the object indicated by the detection signal. In this case, the detection section and the initial position of the obstacle may be calculated by the Kalman filter as expressed in the following Equation (6):

$$\hat{x}(k|k-1) = F(k-1)\hat{x}(k-1|k-1)$$

$$\hat{z}(k|k-1) = H(k)\hat{x}(k|k-1) \qquad (6)$$

where $\hat{x}(k|k-1)$ denotes an estimation value of a status value of the object at a time "k" which is estimated based on information to a time "k-1", $\hat{x}(k-1|k-1)$ denotes an estimation value of a status value of the object at the time "k-1" which is estimated based on the information to the time "k-1", and $\hat{z}(k|k-1)$ denotes an estimation value of a position of the object at the time "k" which is estimated based on the information to the time "k-1".

Here, each track may include the Kalman filer for tracing a specific object sensed by the remote sensor 132-1. That is, each track may include a covariance of an error for correcting a position on the basis of a measurement value and an estimation value of a position of a traced obstacle, and an estimation value, a measurement value, and a covariance which are calculated per time may be stored as histories in the storage 132-9.

A configuration of the Kalman filter included in each track may be expressed as the following Equation (7):

$$x(k) = F(k-1)x(k-1) + v(k-1) \qquad (7)$$

$$z(k) = H(k)x(k) + w(k)$$

$$P(k|k) = \sum_i \beta(k, i)[$$

$$P(k|k, i) + (\hat{x}(k|k, i) - \hat{x}(k|k))(\hat{x}(k|k, i) - \hat{x}(k|k))^T]$$

$$P(k|k-1) = F(k-1)P(k-1|k1)F(k-1)^T + Q(k-1)$$

where x(k) denotes a status value of the object at the time "k", F(k-1) denotes a status change model representing a change when a time is changed from the time "k-1" to the time "k", z(k) denotes a position of the object at the time "k", H(k) denotes an observation model representing a change from a statue of the object to the position of the object, v(k-1) denotes a processing noise at the time "k-1", and w(k) denotes a measurement noise at the time "k". Also, P(k|k) denotes a covariance of an error of the Kalman filter at the time "k" which is calculated based on information to the time "k", and P(k|k-1) denotes a covariance of an error of the Kalman filter at the time "k" which is calculated based on information to the time "k-1". Q(k-1) denotes a prediction covariance at the time "k-1".

The target tracer 132-3 may determine whether the position of the object indicated by the detection signal is included in the detection section corresponding to a track, based on errors of a measurement value and an estimation value of the position of the object and a covariance of each of the errors.

In this case, the target tracer 132-3 may set a range of the detection section, based on a status value of the Kalman filter included in a current track and update a status value of the Kalman filter, based on measurement values included in the detection section. The target tracer 132-3 may calculate a residual based on the measurement value and the estimation value of the position of the object, calculate a residual covariance, based on the observation model and a covariance of an estimation error included in the Kalman filter and determine whether the object enters the detection section, based on the residual and the residual covariance.

Here, the detection section may be set as a section which represents a specific probability value or less in the Gaussian probability distribution having the residual covariance as a variance, and the probability value may be referred to as a gate probability. Therefore, the detection section may be calculated by calculating the residual covariance and setting a gate probability value, and the residual covariance and the gate probability value may be optimized by the Kalman filter with time, whereby the detection section may be optimized with time.

A method of calculating the residual and the residual covariance and a condition where the object is located in the detection section may be expressed as the following Equation (8):

$$v(k,i)=z(k,i)-\hat{z}(k|k-1)$$

$$S(k)=H(k)P(k|k-1)H(k)^T+R(k)$$

$$v(k,i)^T S(k)^{-1} v(k,i) < r \qquad (8)$$

where v(k, i) denotes a residual of an object "i" at a time "k", and z(k, i) denotes a measurement value of a position of the object "i". Also, P(k|k−1) denotes a covariance of an estimation error of the Kalman filter, R(k) denotes a measurement noise at the time "k", S(k) denotes the residual covariance at the time "k", and r denotes a range of a detection section.

The track manager 132-5 may update a position estimation value included in a track, based on a detection signal included in the track corresponding to an object which is located in a detection section.

In this case, in order to update the position estimation value, the track manager 132-5 may calculate a Kalman gain, based on a residual covariance and a covariance of an estimation error and calculate the position estimation value by using information to a current time, based on an estimation value of a position which is estimated based on the Kalman gain, a position measurement value of an object, and information to a previous time. The update of the position estimation value may be expressed as the following Equation (9):

$$K(k) = P(k|k-1)H^T S(k)^{-1} \qquad (9)$$

$$\hat{x}(k|k, i) = \begin{cases} \hat{x}(k|k-1) & i = 0 \\ \hat{x}(k|k-1) + K(k)v(k, i) & i > 0 \end{cases}$$

$$\hat{x}(k|k) = \sum_i \beta(k, i)\hat{x}(k|k, i)$$

where K(k) denotes the Kalman gain.

As described above, the track manager 132-5 may update the position measurement value with time, based on the measurement value, thereby calculating a more accurate position estimation value.

When a distance between an object position estimation value included in a first track and an object position estimation value included in a second track is less than a predetermined reference value, the track manager 132-5 may initialize the first track and the second track, based on a history stored in the storage 132-9.

The storage 132-9 may store a history which is obtained by updating a track. In this case, the history stored in the storage 132-9 may include a position estimation value, a position measurement value, and a covariance value of an estimation error with time of the Kalman filter included in the track.

When a position estimation value is updated as described above, objects indicated by two tracks may collide with each other depending on the case. When a position estimation value indicated by an object is reduced to less than a pre-stored reference value, the track manager 132-5 may determine that the objects indicated by two tracks collide with each other, and initialize the track, based on data included in histories of the two colliding tracks.

Moreover, when all object position estimation values included in a track are not included in a detection section corresponding to the track, the track manager 132-5 may initialize the track, based on a history of the track stored in the storage 132-9. That is, when an object traced by a track deviates from the detection section, or the object traced by the track is determined as noise or an error and thus disappears, the track may fail to trace the object, and thus, the track manager 132-5 may initialize the track and trace a new object.

As described above, a track may trace a moving obstacle by using the Kalman filter. When a track tracing an object fails to trace the object or two tracks collide with each other, a track may be initialized, and a new object may be traced. Accordingly, an object identification performance of a peripheral status detection system is enhanced.

As described above, the target tracer 132-3 and the track manager 132-5 may trace an obstacle to generate or update a track, and data included in the generated or updated track may be transferred to the vehicle controller 132-7 and may be used to control a vehicle in order for the vehicle to avoid an obstacle or issue a warning.

Figure 9:
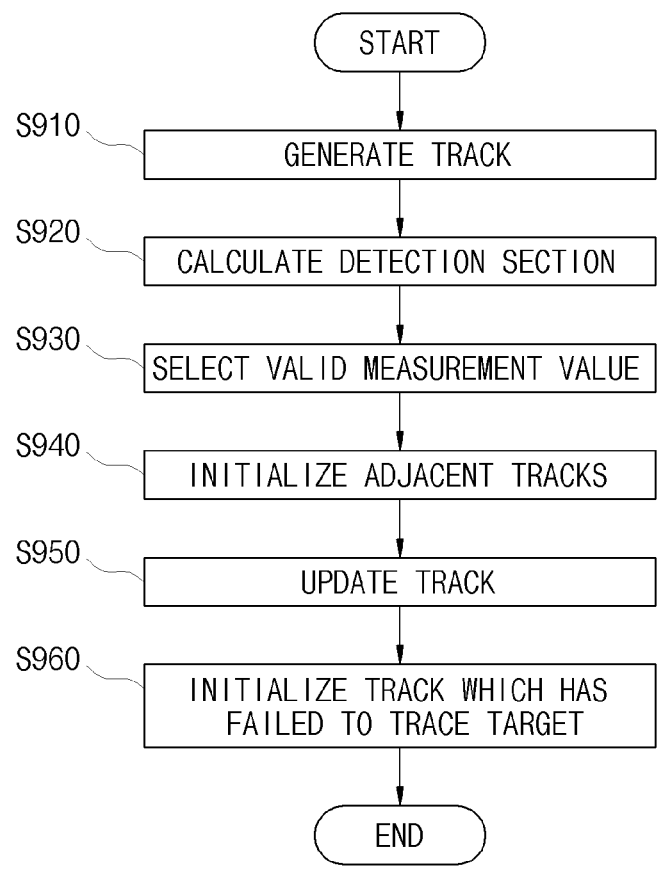
FIG. 9 is a flowchart illustrating a method of optimizing a detection section, according to an embodiment of the present invention.

FIG. 9 is a flowchart illustrating a method of optimizing a detection section, according to an embodiment of the present invention.

Referring to FIG. 9, in step S910, the target tracer 132-3 may generate a track which includes a covariance of an error and a position estimation value corresponding to a distinguished obstacle, based on a detection signal which the remote sensor 132-1 senses a position of an object and outputs.

In this case, as described above, the remote sensor 132-1 may include one or more of a lidar sensor and a radar sensor.

Moreover, a track generated by the target tracer 132-3 may include a Kalman filter which includes a position estimation value and a covariance of an error. In this case, a configuration of the Kalman filter included in the track is as described with reference to Equations (1) and (2).

Subsequently, in step S920, the target tracer 132-3 may calculate a detection section which is a range where an obstacle is detected for the track.

In this case, a size of the detection section may be set to an initial value, based on a position of the object indicated by the detection signal. Also, the detection section may be set as a section which represents a gate probability value or less in the Gaussian probability distribution having a residual covariance as a variance.

Subsequently, in step S930, the target tracer 132-3 may select a valid detection signal, where the position of the object indicated by the detection signal is included in the detection section, from the detection signal.

As described above, the detection signal may include a measurement value of the position of the object traced by a peripheral search system of a vehicle, and the target tracer 132-3 may select a valid measurement value of the measurement value included detection section to update the Kalman filter, and use the updated Kalman filter for tracing an object.

In this case, the target tracer 132-3 may determine whether the position of the object indicated by the detection signal is included in the detection section corresponding to the track, based on errors of a measurement value and an estimation value of the position of the object and a covariance of each of the errors.

The target tracer 132-3 may set a range of the detection section, based on a status value of a Kalman filter included in a current track and update a status value of the Kalman filter by using measurement values included in the detection section. Here, the target tracer 132-3 may calculate a residual based on the measurement value and the estimation value of the position of the object, calculate a residual covariance, based on the observation model and a covariance of an estimation error included in the Kalman filter and determine whether the object enters the detection section, based on the residual and the residual covariance. A method of calculating the residual and the residual covariance and a condition where the object is located in the detection section are as expressed in Equation (8). The residual covariance and a gate probability value may be optimized by the Kalman filter with time, and thus, the detection section may be optimized with time.

Subsequently, in step S940, when a distance between an object position estimation value included in a first track and an object position estimation value included in a second track is less than a predetermined reference value, the track manager 132-5 may initialize the first track and the second track, based on a history stored in the storage 132-9.

The history stored in the storage 132-9 may include a position estimation value, a position measurement value, and a covariance value of an estimation error with time of the Kalman filter included in the track.

When a position estimation value is updated as described above, objects indicated by two tracks may collide with each other depending on the case. When a position estimation value indicated by an object is reduced to less than a pre-stored reference value, the track manager 132-5 may determine that the objects indicated by two tracks collide with each other, and initialize the track, based on data included in histories of the two colliding tracks.

Subsequently, in step S950, the track manager 132-5 may update the selected detection signal and a position estimation value included in a track corresponding to an object of which a position is located in the detection section.

In this case, in order to update the position estimation value, the track manager 132-5 may calculate a Kalman gain, based on a residual covariance and a covariance of an estimation error and calculate the position estimation value by using information to a current time, based on an estimation value of a position which is estimated based on the Kalman gain, a position measurement value of an object, and information to a previous time. The update of the position estimation value is as expressed in Equation (9).

Subsequently, when all object position estimation values included in a track are not included in a detection section corresponding to the track, the track manager 132-5 may initialize the track, based on a history of the track stored in the storage 132-9 and terminate a process.

That is, when an object traced by a track deviates from the detection section, or the object traced by the track is determined as noise or an error and thus disappears, the track may fail to trace the object, and thus, the track manager 132-5 may initialize the track and trace a new object.

As described above, a track may trace a moving obstacle by using the Kalman filter. When a track tracing an object fails to trace the object or two tracks collide with each other, a track may be initialized, and a new object may be traced. Accordingly, an object identification performance of a peripheral status detection system is enhanced.

Data included in a track which is generated or updated by the above-described method may be transferred to the vehicle controller 132-7 and may be used to control a vehicle in order for the vehicle to avoid an obstacle or issue a warning.

As described above, a vehicle control apparatus and method according to an embodiment of the present invention dynamically updates a valid gate representing a section of interest (SOI) which is traced by the peripheral status detection system of a vehicle for sensing an obstacle, and thus accurately traces an obstacle around the vehicle. Therefore, the vehicle control apparatus and method extend a distance to an obstacle of which a position is accurately traced by using only a lidar sensor or a radar sensor, thereby preventing an accident.

Figure 10:
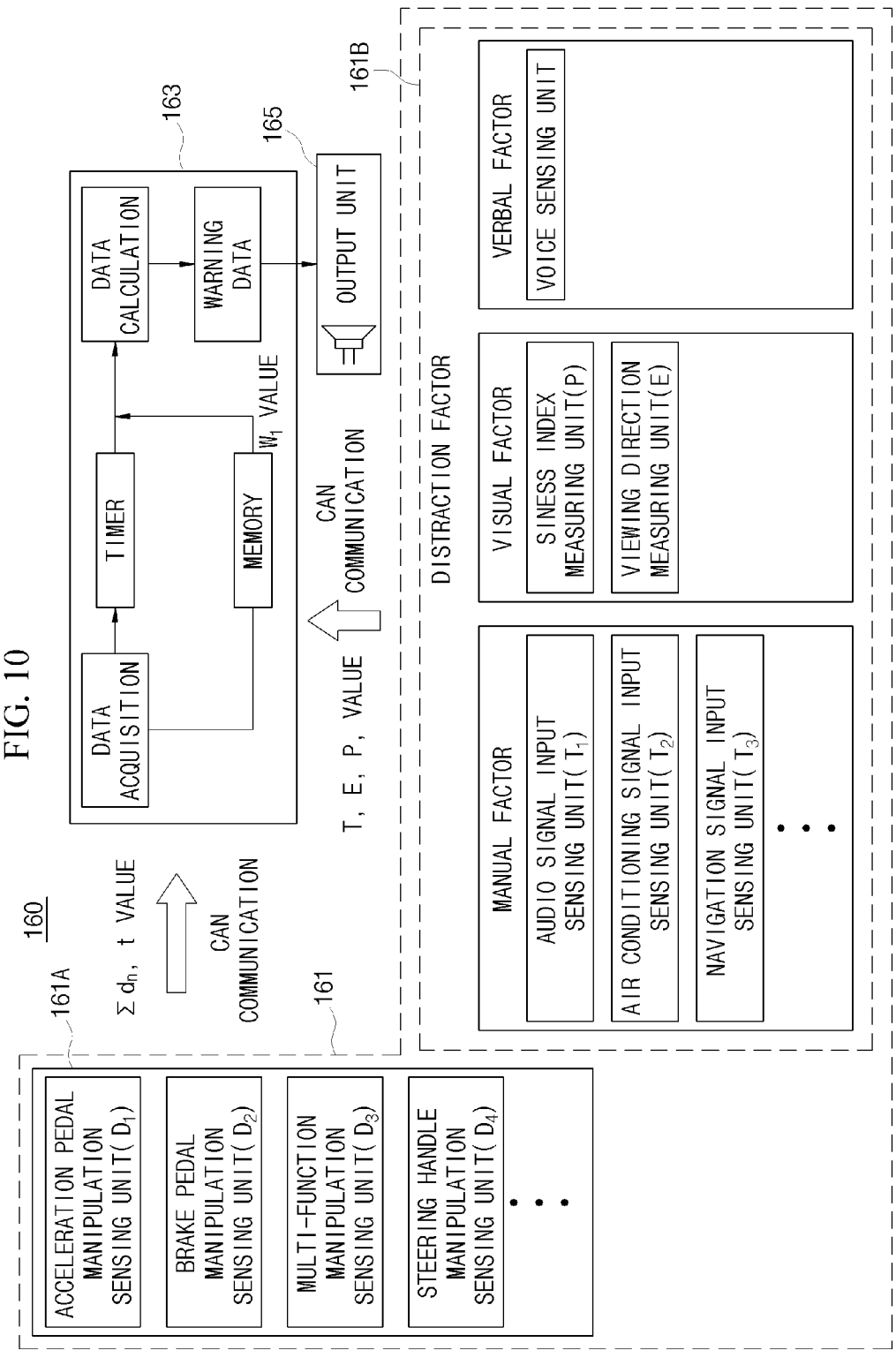
FIG. 10 is a block diagram illustrating a detailed configuration of a driver status sensing system illustrated in FIG. 1.

FIG. 10 is a block diagram illustrating a detailed configuration of the driver status sensing system 160 illustrated in FIG. 1.

Referring to FIG. 10, the driver status sensing system 160 may include an acquisition unit 161, a control unit 163, and an output unit 165.

The acquisition unit 161 may be an element for acquiring driving manipulation information of a vehicle and careless status information of a driver. In this case, the acquisition unit 161 may include a driving manipulation sensing unit 161A and a careless status sensing unit 161B. The acquisition unit 161 may acquire the driving manipulation information by using the driving manipulation sensing unit 161A and acquire the careless status information by using the careless status sensing unit 161B.

The driving manipulation sensing unit 161A may be an element for sensing manipulation of a control unit which necessarily operates for driving a vehicle. For example, the driving manipulation sensing unit 161A may be an electronic control unit (ECU) of the vehicle or a separate module which is included in the ECU.

The driving manipulation sensing unit 161A may include a plurality of manipulation sensing units such as an acceleration pedal manipulation sensing unit $d_1$, a brake pedal manipulation sensing unit $d_2$, a multi-function manipulation sensing unit $d_3$, and a steering handle manipulation sensing unit $d_4$.

Figure 11A:
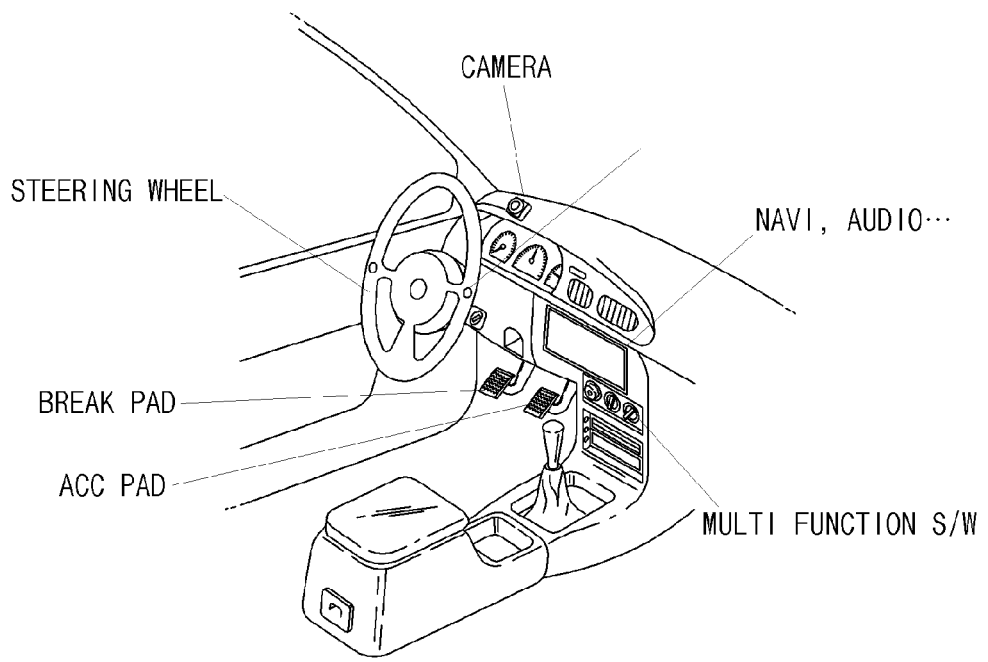
FIGS. 11A and 11B are a diagram illustrating an apparatus for pieces of acquired information, according to an embodiment of the present invention.

As illustrated in FIG. 11A, the plurality of manipulation sensing units included in the driving manipulation sensing unit 161A may sense manipulation for driving of the vehicle, and for example, may sense at least one of acceleration pedal (ACC pad) manipulation, brake pedal manipulation, multi-function switch manipulation, and steering handle manipulation.

In addition, the driving manipulation sensing unit 161A may acquire the driving manipulation information which further includes clutch pedal manipulation or transmission manipulation of a manual-gear vehicle. In this case, the driving manipulation sensing unit 161A may check a velocity of the vehicle, and when the velocity of the vehicle is equal to or higher than a certain velocity (for example, 10 km/h), the driving manipulation sensing unit 161A may acquire the driving manipulation information.

For example, the driving manipulation sensing unit 161A may sense the number "$n_A$" of operations of an acceleration pedal manipulated by a driver at every certain time for a predetermined time. For example, the driving manipulation sensing unit 161A may continuously check whether the acceleration pedal operates (ON), at every second of 50 ms for second of 200 ms.

Likewise, the driving manipulation sensing unit 161A may sense the numbers "$n_B$" and "$n_C$" of operations of the brake pedal and the clutch pedal which are manipulated at every certain time.

As another example, the driving manipulation sensing unit 161A may sense the number "$n_M$" of operations of each multi-function switch which is manipulated by a driver for a certain time. Here, each multi-function switch may be a switch for operating a vehicle wiper or a vehicle lamp such as a turn signal lamp. For example, the driving manipulation sensing unit 161A may count the number of operations of a multi-function switch which is manipulated for second of 200 ms.

As another example, the driving manipulation sensing unit 161A may sense an angular velocity of a steering wheel which is manipulated by the driver for a certain time. In this case, the driving manipulation sensing unit 161A may measure an angle change amount of the steering wheel to calculate the angular velocity without separately measuring the angular velocity. For example, the driving manipulation sensing unit 161A may measure the angle change amount of the steering wheel to calculate the angular velocity at every second of 50 ms for second of 200 ms.

The careless status sensing unit 161B may be an element for sensing a motion of the driver and manipulation of a control unit which additionally operates when the vehicle drives. The careless status sensing unit 161B may include a plurality of sensing units such as an audio signal input sensing unit $T_1$, an air conditioning signal input sensing unit $T_2$, a navigation signal input sensing unit $T_3$, etc.

Moreover, the careless status sensing unit 161B may include a drowsiness index measuring unit P, a viewing direction measuring unit E, and a voice sensing unit V, for sensing a motion (a visual factor or a verbal factor) of the driver. The plurality of sensing units and the plurality of measuring units included in the careless status sensing unit 161B, as illustrated in FIG. 10, may be provided at a certain position of the vehicle and may acquire careless status information, based on information about at least one of manipulation of a peripheral device, a facial image of the driver, and a voice of the driver.

For example, the careless status sensing unit 161B may sense the number "$n_T$" of manipulations of peripheral devices which are made by the driver while the vehicle is driving. Here, the peripheral devices may not be devices essential for driving of the driver unlike an AVN, a vehicle air conditioning device, etc., but may be control units which are manipulated for convenience of the driver or a vehicle indoor environment. For example, the careless status sensing unit 161B may sense the number of inputs of operational switches of peripheral devices, which are manipulated by the driver for a certain time while the vehicle is driving at a certain velocity (for example, 10 km/h) or more, to acquire careless status information.

As another example, the careless status sensing unit 161B may sense a voice of the driver through a microphone which is disposed at a certain position in the vehicle. For example, the careless status sensing unit 161B may check a voice production time and a pulse level (a voice level) of voice data which is received from the microphone for a certain time. For example, the careless status sensing unit 161B may detect a time, at which voice data having a pulse level equal to or higher than a pulse threshold value is received for a certain time (for example, 200 ms), to acquire careless status information by using the pulse threshold value stored in a memory.

Figure 11B:
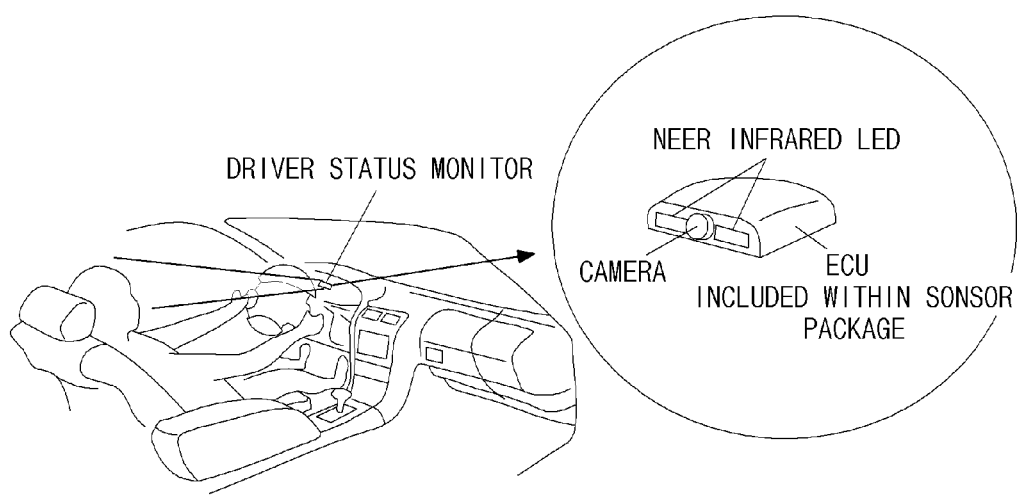

As another example, the careless status sensing unit 161B may receive a facial image of the driver from a camera, which is disposed at a certain position of the vehicle, to acquire eye-closing information and observation negligence information of the driver. In this case, as illustrated in FIG. 11B, the camera may include a near infrared light emitting diode (LED) for recording an image at daytime and nighttime.

For example, the careless status sensing unit 161B may separately extract an eye region image of the driver from the facial image of the driver. In this case, the eye region image may be extracted from the facial image of the driver through image processing. That is, the careless status sensing unit 161B may acquire careless status information such as the eye closing and observation negligence of the driver, based on the facial image of the driver acquired from the camera and the eye region image included in the facial image.

The careless status sensing unit 161B may acquire the eye-closing information of the driver, based on the eye region image extracted from the facial image of the driver.

Figure 12A:
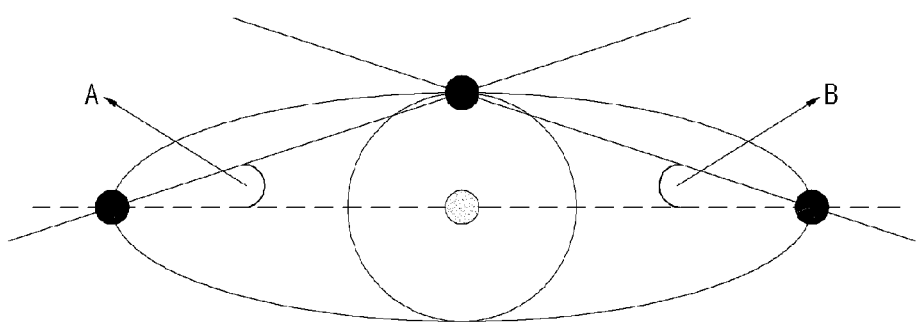
FIGS. 12A and 12B are a diagram for describing a method of checking the eye closing of a driver, according to an embodiment of the present invention.
Figure 12B:
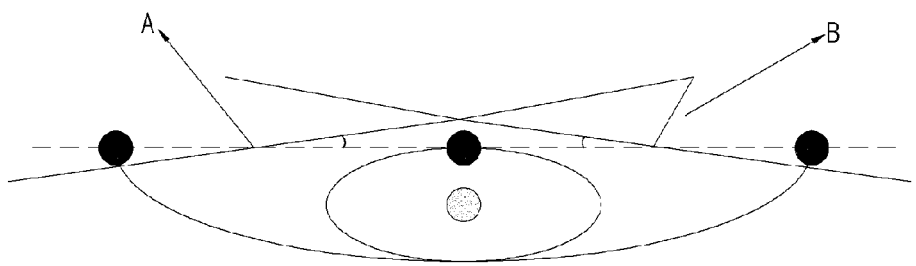
Figure 13A:
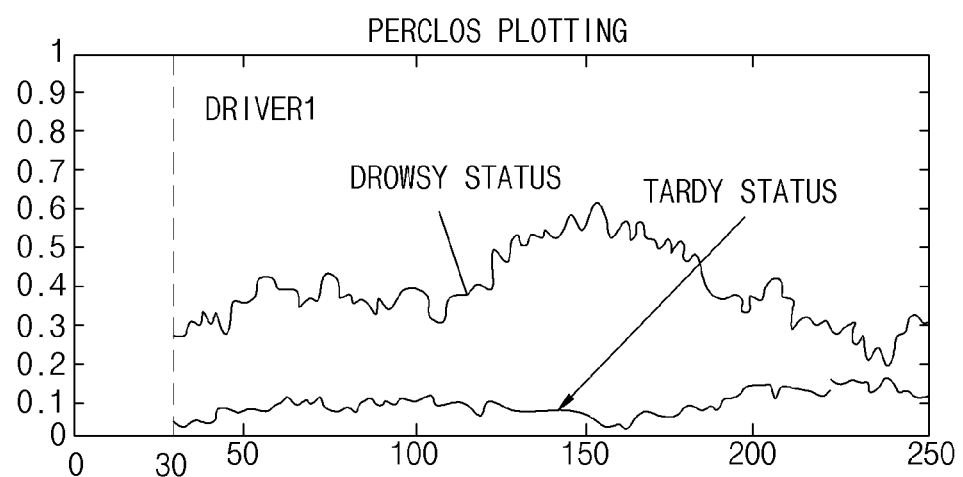
FIGS. 13A to 13F are a graph for describing a drowsiness load of a driver in a driving interruption load according to an embodiment of the present invention.
Figure 13B:
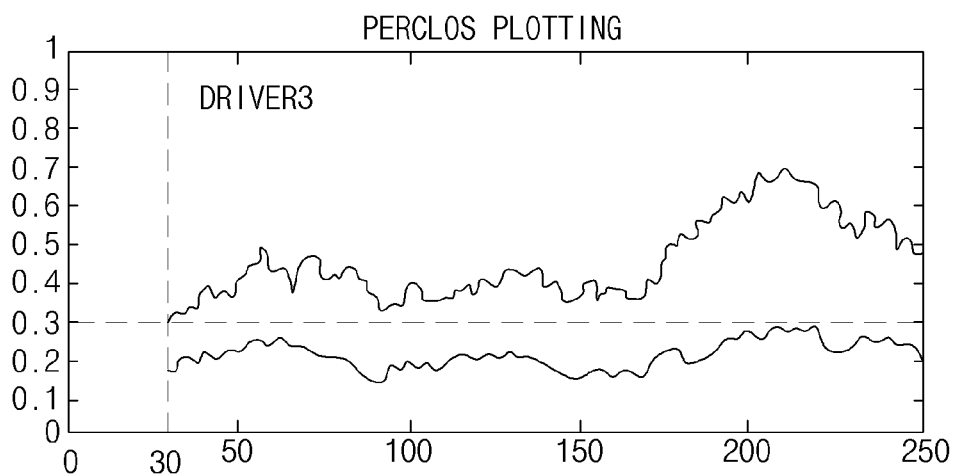
Figure 13C:
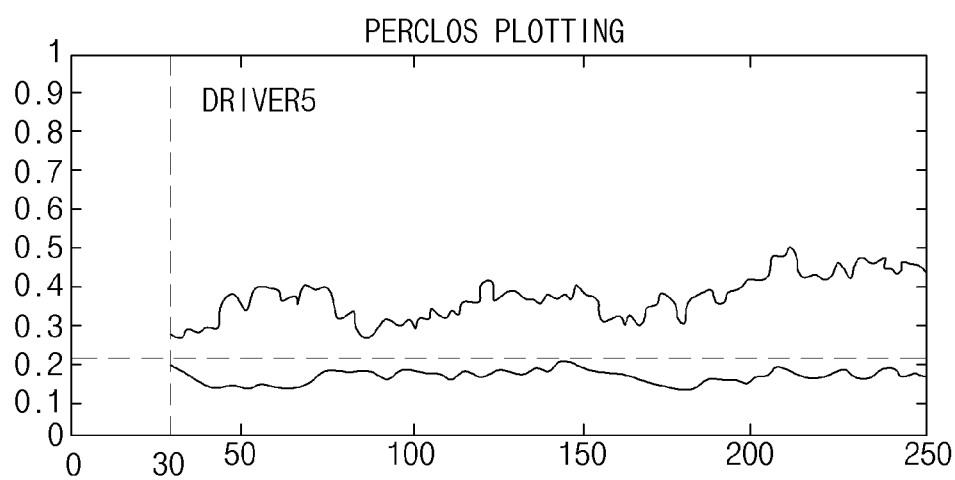
Figure 13D:
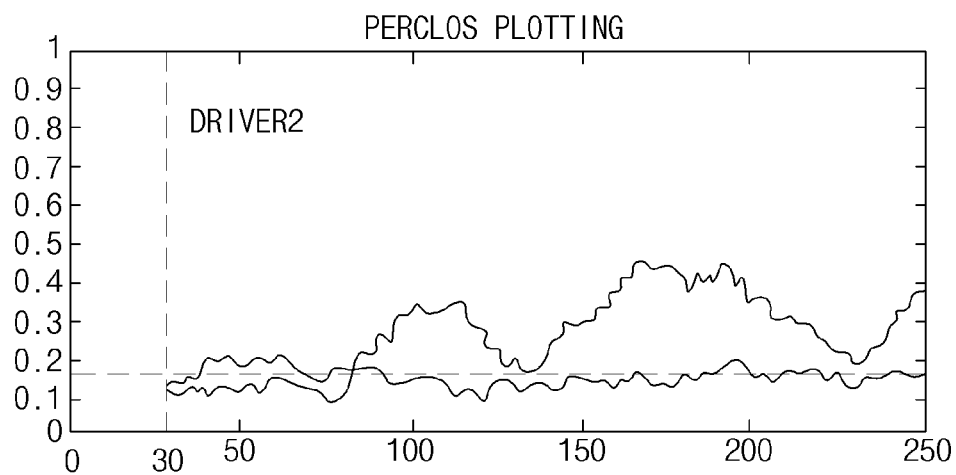
Figure 13E:
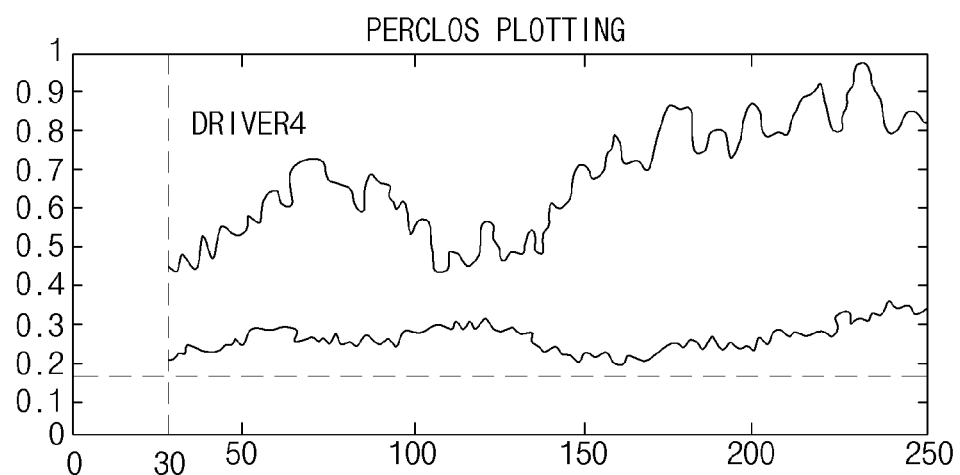
Figure 13F:
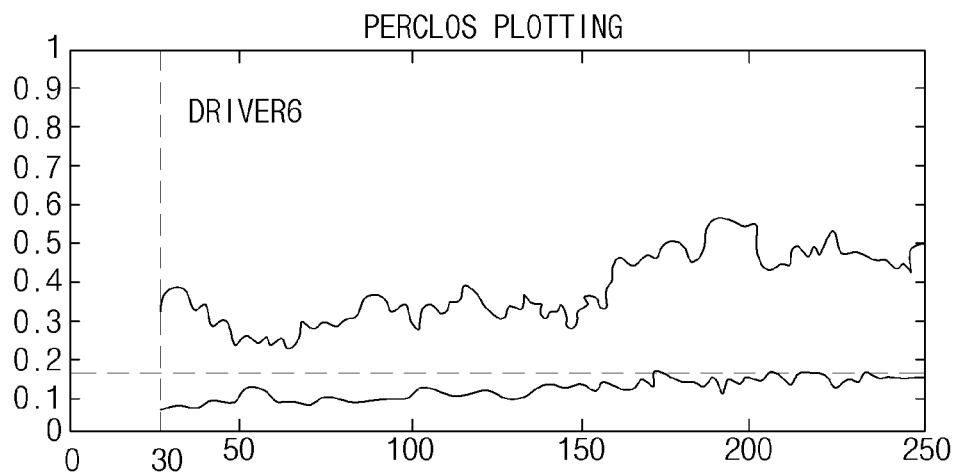

Referring to FIGS. 12A and 12B, the careless status sensing unit 161B may sense an eyelid region from the eye region image, and when a sum of ∠A and ∠B which are angles of eyelids is equal to or less than ∠C which is a predetermined threshold angle value (∠A+∠B≤∠C), the careless status sensing unit 161B may determine the driver as closing eyes.

The careless status sensing unit 161B may check the angles of the eyelids for a certain time to sense the number of times the driver closes eyes, and calculate a certain time value and the number of times the driver closes the eyes, thereby acquiring a drowsing time (a drowsiness index) of the driver. For example, the careless status sensing unit 161B may measure (count) the number of eye-closings by dividing one second into sections of 250 ms, and when a counting value is 3, a time (the drowsiness index) when the driver closes the eyes may be acquired as 750 ms.

Moreover, the careless status sensing unit 161B may acquire the observation negligence of the driver, based on the facial image of the driver and the eye region image included in the facial image.

Figure 15A:
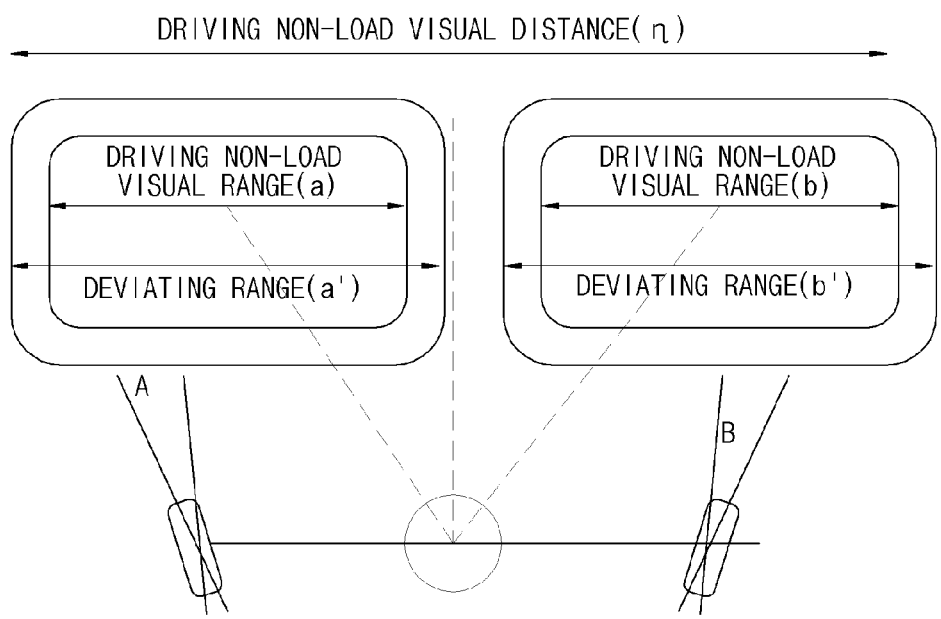
FIGS. 15A to 15C are a diagram for describing an observation negligence load of a driver in the driving interruption load according to an embodiment of the present invention.
Figure 15B:
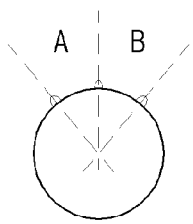
Figure 15C:
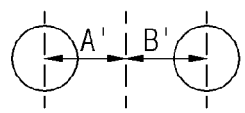

Referring to FIG. 15A to 15C, in an observation negligence range, observation negligence information may be acquired by checking (a viewing direction) whether a viewing range of the driver is within a visual distance "η" where there is no load when the vehicle drives, based on an angle of a vehicle wheel (i.e., an angle change amount (ΘA or ΘB in FIG. 15A) of a wheel in a center of the vehicle) instead of an angle of a steering wheel. The viewing range may be checked by performing an operation which calculates an angle of a face (α in FIG. 15B) from the facial image of the driver acquired from the camera and then measures a position (a position of pupil) of a pupil (β in FIG. 15C) in the eye region image.

In detail, in a case where a gear lever is D gear or N gear when an angle of the steering wheel is within a certain angle, when the viewing of the driver does not enter a driving non-load visual range (a, b) for a certain time, the careless status sensing unit 161B may determine observation negligence, check a corresponding time, and acquire the observation negligence information. For example, in a case where an angle of the steering wheel is less than ±15 degrees when a velocity of the vehicle is 10 Km/h or more and the gear lever is the D gear or the N gear, when the viewing of the driver does not enter the driving non-load visual range (a, b) for 1.5 seconds or more, the careless status sensing unit 161B may determine observation negligence for the front of the vehicle.

The control unit 163 may be an element that controls an overall operation of the driver status sensing system 160, and may be an electronic control unit. For example, the control unit 163 may be referred to as a driving workload compute unit (DWC).

In detail, the control unit 163 may calculate a driving manipulation load and a driving interruption load, based on the driving manipulation information and the careless status information acquired from the acquisition unit 161.

Moreover, the control unit 163 may compare the driving manipulation load with the driving interruption load to determine whether a driving status of the driver is a safety driving status, and when it is determined that the driving status of the driver is not the safety driving status, the control unit 163 may control the output unit 165 to output warning information.

First, the control unit 163 may calculate the driving manipulation load and the driving interruption load, based on the driving manipulation information and the careless status information acquired from the acquisition unit 161.

For example, the control unit 163 may calculate the driving manipulation load "$W_d$", based on the driving manipulation information acquired from the driving manipulation sensing unit 161A of the acquisition unit 161.

In detail, the control unit 163 may acquire the driving manipulation information from the driving manipulation sensing unit 161A, read an item-based weight value of the driving manipulation information from the memory, and calculate the driving manipulation load.

Here, the weight value may be a value which is extracted and predetermined for each item of driving manipulation information through various experiments. Alternatively, the weight value may be a value which is arbitrarily predetermined for each item by a worker. Also, the memory may be a storing means for storing data, and for example, may be a nonvolatile memory.

Moreover, the control unit 163 may calculate a load for each item, based on an item included in the driving manipulation information and a weight value corresponding to the item. For example, when driving manipulation information of acceleration pedal manipulation, brake pedal manipulation, multi-function switch manipulation, and steering handle manipulation is acquired from the acquisition unit 161, the control unit 163 may read, from the memory, a weight value "$D_A$" of the acceleration pedal manipulation, a weight value "$D_B$" of the brake pedal manipulation, a weight value "$D_M$" of the multi-function switch manipulation, and a weight value "$\theta$" of the steering handle manipulation.

For example, when time information and times information of each item are acquired from the acquisition unit 161 in units of 50 ms for second of 200 ms, the driving manipulation load "$W_d$" calculated by the control unit 163 for second of 200 ms may be expressed as the following Equation (10):

$$W_d = D_A \times n_A \times 50 \text{ ms} + D_B \times n_B \times 50 \text{ ms} + D_C \times n_C \times 50 \text{ ms} + D_M \times n_M + \theta \times n_\theta / 50 \text{ ms} \quad (10)$$

Each item included in the driving manipulation information may be added or subtracted depending on the case. For example, when clutch pedal manipulation and transmission manipulation are included in the driving manipulation information depending on the kind of a vehicle, the control unit 163 may calculate the driving manipulation load in further consideration of a weight value of the clutch pedal manipulation and a weight value of the transmission manipulation.

As another example, the control unit 163 may calculate the driving interruption load "$W_i$", based on the careless status information acquired from the careless status sensing unit 161B of the acquisition unit 161. In detail, the control unit 163 may calculate loads of the items included in the careless status information acquired from the careless status sensing unit 161B, and summate the calculated loads of the items to calculate the driving interruption load.

The control unit 163 may calculate a peripheral device manipulation load "T(n)", based on the number of manipulations of peripheral devices acquired from the careless status sensing unit 161B of the acquisition unit 161.

For example, the control unit 161 may calculate the peripheral device manipulation load in further consideration of a weight value of peripheral device manipulation which is stored in the memory. For example, when the number of inputs of peripheral device manipulation which is made by the driver for second of 20 ms is acquired from the acquisition unit 161, the control unit 163 may perform an arithmetic operation on the number of inputs of the peripheral device manipulation and a weight value to calculate the peripheral device manipulation load "T(n)".

Furthermore, the control unit 163 may calculate a voice load "V(n)", based on voice data of the driver acquired from the careless status sensing unit 161B of the acquisition unit 161. In detail, the control unit 163 may calculate the voice load, based on a pulse threshold value of the voice data stored in the memory. For example, the control unit 163 may calculate a time, at which voice data having the pulse threshold value or more is received, in the voice data of the driver which is acquired from the careless status sensing unit 161B of the acquisition unit 161 for a certain time (for example, 200 ms), thereby calculating a voice load "V(t)".

Moreover, the control unit 163 may calculate a drowsiness load "P(t)" and a driving observation negligence load "E(t)", based on the eye-closing information and the observation negligence information which are included in the careless status information acquired from the careless status sensing unit 161B of the acquisition unit 161.

Referring to a graph of FIGS. 13A to 13F, when the driver is in a tardy state, a change width of the graph may be very stably narrow, but a PERCLOS value when the driver is in a drowsy status may be very severe in change and may be higher in whole numerical value than the tardy status. Here, the PERCLOS value may be expressed as the following Equation (11):

$$PERCLOS(\%) = \frac{\text{accumulation of eye-closing time}}{\text{certain measurement time for accumulation}} \times 100 \quad (11)$$

Based on the graph of FIGS. 13A to 13F, when it is checked by the control unit 163 that the PERCLOS value is a certain percentage (30%) or more, namely, it is checked through the careless status sensing unit 161B that the driver have closed eyes for a certain time (for example, 75 seconds) with respect to a certain time (for example, 250 seconds), the control unit 163 may control the output unit 165 to output a vehicle warning sound. This is for immediately outputting a warning sound to a driver by determining the driving of the driver as drowsy driving when it is checked that the driver has closed eyes for a certain time or more because the drowsy driving is the highest dangerous factor in driving a vehicle.

Hereinafter, an operation where the control unit 163 checks the eye closing of the driver will be described with reference to a flowchart of FIG. 14.

In detail, in step S1410, the control unit 163 may determine whether a vehicle velocity "V" is a certain velocity (for example, V≥10 Km/h) or more. When it is determined that the vehicle velocity "V" is the certain velocity or more, by using the careless status sensing unit 161B, the control unit 163 may check the number "y" of eye closings from an angle of an eyelid per certain time "x" (for example, 250 ms or 0.25 s) for a certain measurement time "N" to calculate an eye closing time (a drowsing time) of the driver.

In step S1420, the control unit 163 may determine whether the angle of the eyelid is ∠A+∠B≤∠C. When the angle of the eyelid is ∠A+∠B≤∠C, the control unit 163 may determine the driver as closing the eyes to count (y++) the number of eye closings in step S1430.

The control unit 163 may count (x+=0.25, y++) the number "y" of eye closings per certain time "x", and when the number of eye closings is three (x=1, y=3) for one second in step S1440, the control unit 163 may count (P++) a patient factor value "P" and repeat the operation while increasing (N++) a time by one second in step S1450.

For example, when the patient factor value "P" is 100 or more within a measurement time of 250 seconds in step S1460, the control unit 163 may control the output unit 165 to generate a warning event in step S1470. At this time, the control unit 163 may change the patient factor value "P" to 99, reduce (P=99, N-=1) the measurement time "N" by one second, repeat the above-described steps, and calculate an eye closing time (a drowsing time) of the driver. In addition, the control unit 163 may check a case where the PERCLOS value is 30% or more for a certain time, thereby calculating the drowsiness load "P(t)".

Moreover, the control unit 163 may calculate the observation negligence load "E(t)", based on the observation negligence information acquired from the careless status sensing unit 161B.

As illustrated in FIG. 15A, when the viewing range deviates from the driving non-load visual distance "η", a factor value of the load factor "P" may be changed according to a deviating range.

When a deviating range (a', b') is predetermined, the control unit 163 may read a factor value of a load factor from the memory for each range corresponding to a current viewing range of the driver, thereby calculating the observation negligence load "E(t)".

The control unit 163 may perform an arithmetic operation on the calculated peripheral device manipulation load "T(n)", voice load "V(t)", drowsiness load "P(t)", and observation negligence load "E(t)" to calculate the driving interruption load "$W_i$".

Moreover, depending on a status of the vehicle and the case, at least one of loads which are acquired based on the careless status information may not be considered for calculating the driving interruption load.

The control unit 163 may compare the driving manipulation load "$W_d$" with the driving interruption load "$W_i$" to determine a safety driving status of the driver.

In detail, when a value of the driving interruption load "$W_i$" subtracted from the driving manipulation load "$W_d$" is equal to or less than a predetermined spare load "$W_l$", the control unit 163 may determine that the driver is not in a safety driving status. Here, the predetermined spare load "$W_l$" may be a value which is extracted from a driving manipulation load and driving information (including a change gear status, vehicle acceleration, steering, and/or the like) through an experiment based on a condition of an experimented driver and is stored in the memory, and may be varied ($W_d \propto W_l$) depending on a driving condition. That is, a condition expressed as the following Equation (12) may be satisfied for determining a driving status of the driver as the safety driving status:

$$\sum_{t=t1}^{t=t2} \{W_d(t, n) - (v(t) + T(n) + E(t) + P(t))\} \geq W_l \quad (12)$$

$$W_d = d_1 t_1 + d_2 t_2 + d_3 t_3 + d_4 t_4$$

where t denotes a time value, and n is a times value.

Figure 16:
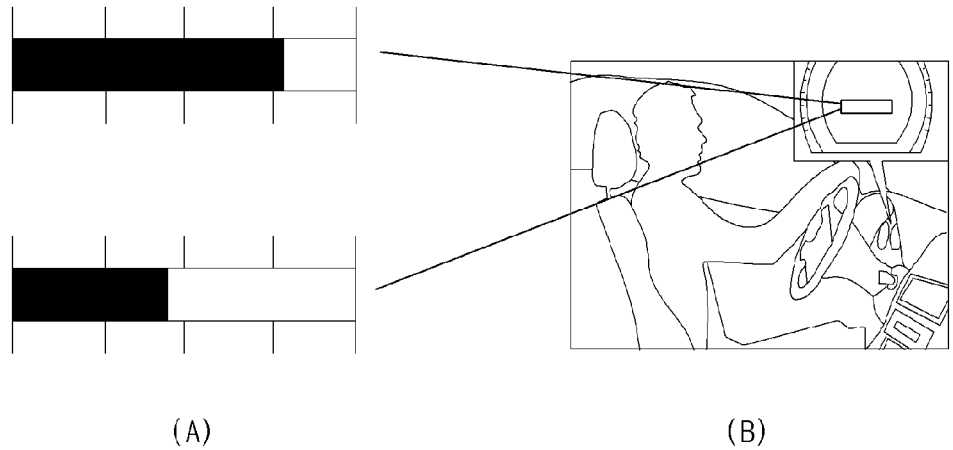
FIG. 16 is a diagram illustrating an output of a screen according to an embodiment of the present invention.

The output unit 165 may be an element for outputting a screen and a warning sound, and may include a liquid crystal display (LCD) and a speaker. For example, as illustrated in FIG. 16 (b), the output unit 165 may output the screen and the warning sound through a cluster. Alternatively, the output unit 165 may display the screen through an audio display. In addition, as illustrated in FIG. 16 (a), the output unit 165 may display a safety driving status determination result and a result value thereof, which are obtained by the control unit 163, on the screen in a rod graph form. In this case, the rod graph may be displayed in various colors.

For example, the control unit 163 may control the output unit 165 to display information of a current load, which is based on a difference between the driving manipulation load and the driving interruption load, as a rod graph on a screen.

In detail, a result value "C" which is obtained by dividing, by the spare load "$W_l$", a difference between the driving manipulation load "$W_d$" and the driving interruption load "$W_i$" calculated by the control unit 163 may be shown as a percentage unit of the rod graph.

For example, a case where it is difficult to drive the vehicle is set to 75%, and when the result value "C" is 75% or more, the control unit 163 may control the output 165 to display the rod graph in red. Also, by controlling the output unit 165 for the rod graph to flicker, the control unit 163 may remind the driver of a driving danger of the vehicle.

In this case, the control unit 163 may control the output unit 165 to output the warning sound, thereby issuing a warning to the driver.

When the result value "C" is less than 75%, the rod graph may be displayed in green and thus may inform the driver of a safe status.

Furthermore, when the result value "C" which is obtained by dividing a difference between the driving manipulation load "$W_d$" and the driving interruption load "$W_i$" by the spare load "$W_l$" is equal to or greater than a certain level (for example, 85%), the control unit 163 may forcibly turn off power of an AVN which has no difficulty to perform the safe driving of the vehicle.

In addition, the control unit 163 may increase volume of the warning sound output by the output unit 165 so as to be proportional to the power of the result value "C", thereby strongly warning the driver of a driving danger.

As described above, the present invention may compare a driving load, which occurs in driving a vehicle, with a driving interruption load which interrupts the driving of the vehicle like a peripheral device, drowsiness of a driver, and/or the like, and thus check a safety driving status of the driver. The present invention may issue a warning to the driver when a load of interrupting the driving of the vehicle is high, and depending on the case, the present invention may forcibly stop an operation of an element (for example, a peripheral device), which is not essential for the driving of the vehicle, to decrease a driving interruption load which interrupts the driving of the vehicle, thereby enabling the driver to safely drive the vehicle.

Figure 17:
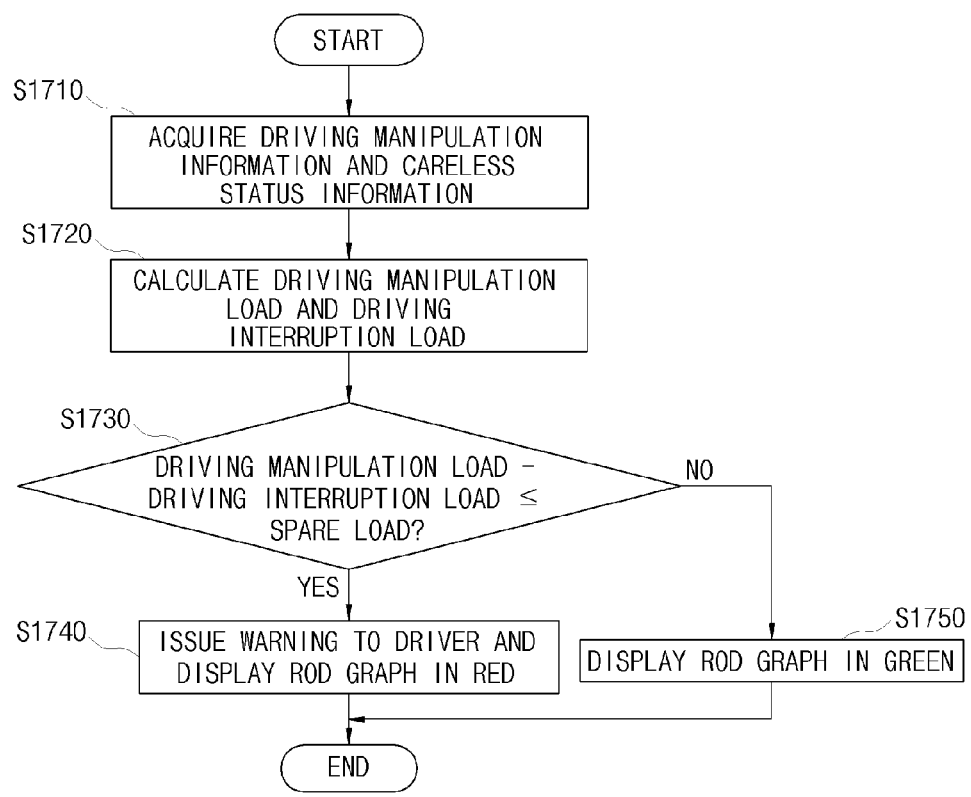
FIG. 17 is a flowchart illustrating a driver status sensing method according to an embodiment of the present invention.

FIG. 17 is a flowchart illustrating a driver status sensing method according to an embodiment of the present invention.

First, in step S1710, the driver status sensing system 160 may acquire driving manipulation information and careless status information of a driver.

In detail, the driver status sensing system 160 may sense driving manipulations of driving control units, which are essential for driving of the vehicle, to acquire the driving manipulation information.

For example, the driver status sensing system 160 may acquire driving manipulation information by sensing at least one of acceleration pedal (ACC pad) manipulation, brake pedal manipulation, multi-function switch manipulation, and steering handle manipulation. In this case, the driver status sensing system 160 may check a velocity of the vehicle, and when the velocity of the vehicle is equal to or higher than a certain velocity (for example, 10 km/h), the driver status sensing system 160 may acquire the driving manipulation information.

For example, the driver status sensing system 160 may sense the number "$n_A$" of operations of an acceleration pedal manipulated by a driver at every certain time for a predetermined time. Likewise, the driver status sensing system 160 may sense the numbers "$n_B$" and "$n_C$" of operations of the brake pedal and the clutch pedal which are manipulated at every certain time.

As another example, the driver status sensing system 160 may sense the number "$n_M$" of operations of each multi-function switch which is manipulated by a driver for a certain time. Here, each multi-function switch may be a switch for operating a vehicle wiper or a vehicle lamp such as a turn signal lamp.

As another example, the driver status sensing system 160 may sense an angular velocity of a steering wheel which is manipulated by the driver for a certain time. In this case, the driver status sensing system 160 may measure an angle change amount of the steering wheel to calculate the angular velocity without separately measuring the angular velocity.

Furthermore, the driver status sensing system 160 may acquire careless status information, based on a peripheral device which is selectively controlled by the driver while the vehicle is driving, a voice of the driver, and facial information.

For example, the driver status sensing system 160 may sense the number "nT" of manipulations of peripheral devices which are made by the driver while the vehicle is driving. Here, the peripheral devices may not be devices essential for driving of the driver unlike an AVN, a vehicle air conditioning device, etc., but may be control units which are manipulated for convenience of the driver or a vehicle indoor environment.

As another example, the driver status sensing system 160 may sense a voice of the driver through a microphone which is disposed at a certain position in the vehicle. For example, the driver status sensing system 160 may check a voice production time and a pulse level (a voice level) of voice data which is received from the microphone for a certain time.

As another example, the driver status sensing system 160 may receive a facial image of the driver from a camera, which is disposed at a certain position of the vehicle, to acquire eye-closing information and observation negligence information of the driver. In this case, as illustrated in FIG. 11B, the camera may include a near infrared LED for recording an image at daytime and nighttime.

For example, the driver status sensing system 160 may separately extract an eye region image of the driver from the facial image of the driver. In this case, the eye region image may be extracted from the facial image of the driver through image processing. That is, the driver status sensing system 160 may acquire careless status information such as the eye closing and observation negligence of the driver, based on the facial image of the driver acquired from the camera and the eye region image included in the facial image.

The driver status sensing system 160 may acquire the eye-closing information of the driver, based on the eye region image extracted from the facial image of the driver. Referring to FIGS. 12A and 12B, the driver status sensing system 160 may sense an eyelid region from the eye region image, and when a sum of $\angle A$ and $\angle B$ which are angles of eyelids is equal to or less than $\angle C$ which is a predetermined threshold angle value ($\angle A + \angle B \leq \angle C$), the careless status sensing unit 161B may determine the driver as closing eyes.

The driver status sensing system 160 may check the angles of the eyelids for a certain time to sense the number of times the driver closes eyes, and calculate a certain time value and the number of times the driver closes the eyes, thereby acquiring eye-closing information (a drowsiness time) of the driver.

Moreover, the driver status sensing system 160 may acquire the observation negligence of the driver, based on the facial image of the driver and the eye region image included in the facial image.

Referring to FIGS. 15A to 15C, in an observation negligence range, observation negligence information may be acquired by checking (a viewing direction) whether a viewing range of the driver is within a visual distance "η" where there is no load when the vehicle drives, based on an angle of a vehicle wheel (i.e., an angle change amount ($\Theta A$ or $\Theta B$ in FIG. 15A) of a wheel in a center of the vehicle) instead of an angle of a steering wheel. The viewing range may be checked by performing an operation which calculates an angle of a face (α in FIG. 15B) from the facial image of the driver acquired from the camera and then measures a position (a position of pupil) of a pupil (β in FIG. 15C) in the eye region image.

In detail, in a case where a gear lever is D gear or N gear when an angle of the steering wheel is within a certain angle, when the viewing of the driver does not enter a driving non-load visual range (a, b) for a certain time, the driver status sensing system 160 may determine observation negligence, check a corresponding time, and acquire the observation negligence information.

First, in step S1720, the driver status sensing system 160 may calculate the driving manipulation load and the driving interruption load, based on the driving manipulation information and the careless status information which is acquired in step S1710.

For example, the driver status sensing system 160 may calculate the driving manipulation load "$W_d$", based on the driving manipulation information. In detail, the driver status sensing system 160 may acquire the driving manipulation information, read an item-based weight value of the driving manipulation information from the memory, and calculate the driving manipulation load.

Here, the weight value may be a value which is extracted and predetermined for each item of driving manipulation information through various experiments. Alternatively, the weight value may be a value which is arbitrarily predetermined for each item by a worker.

Moreover, the driver status sensing system 160 may calculate a load for each item, based on an item included in the driving manipulation information and a weight value corresponding to the item. For example, when driving manipulation information of acceleration pedal manipulation, brake pedal manipulation, multi-function switch manipulation, and steering handle manipulation is acquired, the driver status sensing system 160 may read, from the memory, a weight value "$D_A$" of the acceleration pedal manipulation, a weight value "$D_B$" of the brake pedal manipulation, a weight value "$D_M$" of the multi-function switch manipulation, and a weight value "θ" of the steering handle manipulation. For example, when time information and times information of each item are acquired in units of 50 ms for second of 200 ms, the driving manipulation load "$W_d$" for second of 200 ms may be expressed as Equation (10).

As another example, the driver status sensing system 160 may calculate the driving interruption load "$W_i$", based on the careless status information. In detail, the driver status sensing system 160 may calculate loads of the items included in the careless status information and summate the calculated loads of the items to calculate the driving interruption load.

The driver status sensing system 160 may calculate a peripheral device manipulation load "T(n)", based on the number of manipulations of peripheral devices. For example, the driver status sensing system 160 may calculate the peripheral device manipulation load in further consideration of a weight value of peripheral device manipulation which is stored in the memory. For example, when the number of inputs of peripheral device manipulation which is made by the driver for second of 20 ms is acquired, the driver status sensing system 160 may perform an arithmetic operation on the number of inputs of the peripheral device manipulation and a weight value to calculate the peripheral device manipulation load "T(n)".

Furthermore, the driver status sensing system 160 may calculate a voice load "V(n)", based on voice data of the driver acquired. In detail, the driver status sensing system 160 may calculate the voice load, based on a pulse threshold value of the voice data stored in the memory. For example, the driver status sensing system 160 may calculate a time, at which voice data having the pulse threshold value or more is received, in the voice data of the driver which is acquired for a certain time (for example, 200 ms), thereby calculating a voice load "V(t)".

Moreover, the driver status sensing system 160 may calculate a drowsiness load "P(t)" and a driving observation negligence load "E(t)", based on the eye-closing information and the observation negligence information which are included in the careless status information.

Figure 14:
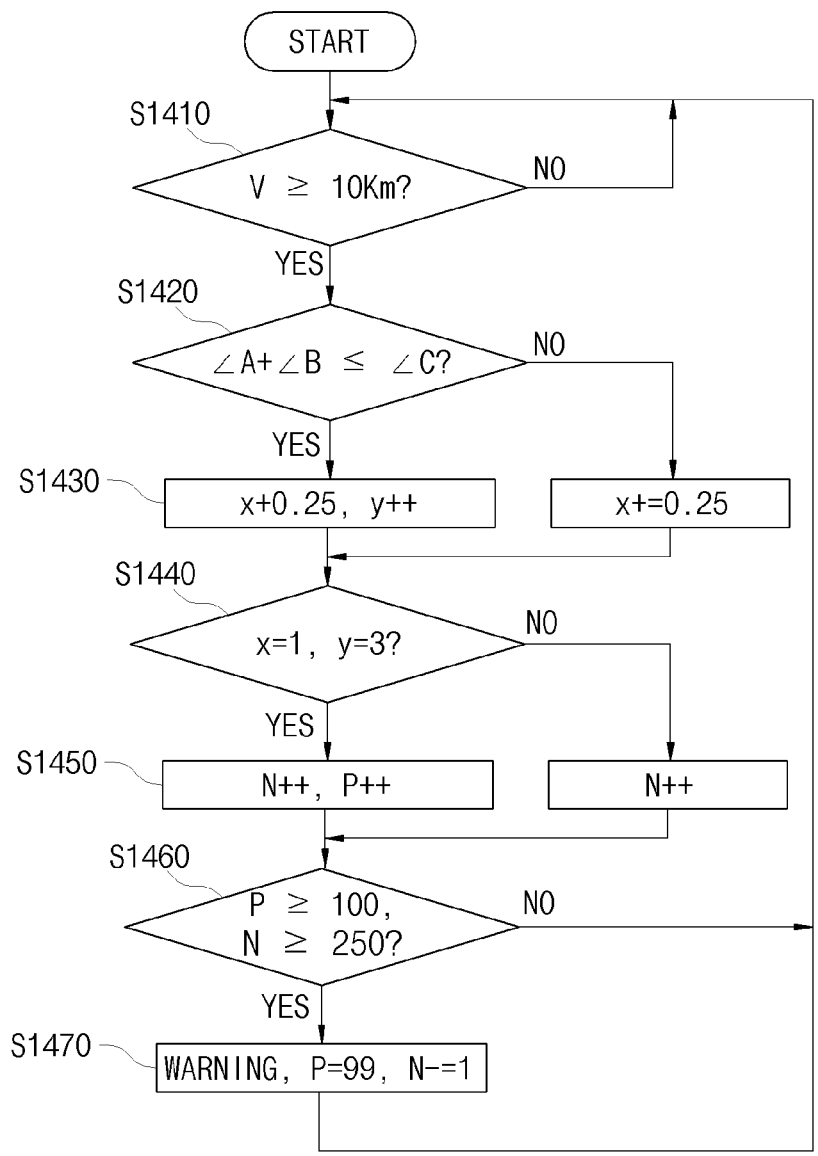
FIG. 14 is a flowchart illustrating an operation of checking the eye closing of a driver, according to an embodiment of the present invention.

In this case, the driver status sensing system 160 may perform an operation of checking the eye closing of the driver as in the flowchart of FIG. 14. The driver status sensing system 160 may check the number "y" of eye closings from an angle of an eyelid per certain time "x" for a certain measurement time "N" to calculate an eye closing time (a drowsing time) of the driver. Furthermore, the driver status sensing system 160 may convert a value, which is obtained by counting (P) a case where a PERCLOS value is equal to or more than 30% for a certain time, into a load factor to calculate a drowsiness load "P(t)".

Moreover, the driver status sensing system 160 may calculate the observation negligence load "E(t)", based on the observation negligence information included in the careless status information. As illustrated in FIGS. 15A to 15C, when the viewing range deviates from the driving non-load visual distance "η", a factor value of the load factor "P" may be changed according to a deviating range. In FIG. 15A, when a deviating range (a', b') is predetermined, the driver status sensing system 160 may read a factor value of a load factor from the memory for each range corresponding to a current viewing range of the driver, thereby calculating the observation negligence load "E(t)".

The driver status sensing system 160 may perform an arithmetic operation on the calculated peripheral device manipulation load "T(n)", voice load "V(t)", drowsiness load "P(t)", and observation negligence load "E(t)" to calculate the driving interruption load "$W_i$".

In step S1730, the driver status sensing system 160 may compare a predetermined spare load "$W_l$" with a difference between the driving manipulation load "$W_d$" and the driving interruption load "$W_i$".

In detail, when a value of the driving interruption load "$W_i$" subtracted from the driving manipulation load "$W_d$" is equal to or less than a predetermined spare load "$W_l$", the driver status sensing system 160 may determine that the driver is not in a safety driving status. Here, the predetermined spare load "$W_l$" may be a value which is extracted from a driving manipulation load and driving information (including a change gear status, vehicle acceleration, steering, and/or the like) through an experiment based on a condition of an experimented driver and is stored in the memory, and may be varied ($W_d \propto W_l$) depending on a driving condition. In this case, the driver status sensing system 160 may calculate a result value "C" which is obtained by dividing the difference between the driving manipulation load "$W_d$" and the driving interruption load "$W_i$" by the predetermined spare load "$W_l$".

For example, a case where it is difficult to drive the vehicle may be set to a threshold percentage value, and when the result value "C" which is calculated in step S1730 is equal to or greater than the threshold percentage value, the driver status sensing system 160 may issue a warning to the driver in step S1740.

The case where it is difficult to drive the vehicle is set to 75%, and when the result value "C" is 75% or more, the driver status sensing system 160 may display a rod graph, which shows a current load, in red. Also, by allowing the rod graph to flicker, the driver status sensing system 160 may remind the driver of a driving danger of the vehicle. In this case, the driver status sensing system 160 may output a warning sound to issue a warning to the driver.

For example, when the result value "C" which is calculated in step S1730 is less than 75%, the driver status sensing system 160 may display the rod graph, which shows the current load, in green and thus may inform the driver of a safe status in step S1750.

As described above, the present invention may compare a driving load, which occurs in driving a vehicle, with a driving interruption load which interrupts the driving of the vehicle like a peripheral device, drowsiness of a driver, and/or the like, and thus check a safety driving status of the driver. The present invention may issue a warning to the driver when a load of interrupting the driving of the vehicle is high, and depending on the case, the present invention may forcibly stop an operation of an element (for example, a peripheral device), which is not essential for the driving of the vehicle, to decrease a driving interruption load which interrupts the driving of the vehicle, thereby enabling the driver to safely drive the vehicle.

Moreover, when a driving habit indicates a case where a vehicle is driven by a plurality of different drivers, learning is performed without considering that the different drivers have different driving pattern learnings and driving situations, thereby removing a driver habit recognition defect.

Moreover, the present invention solves a problem where lanes are not recognized in lateral control when backlight occurs and a vehicle enters a tunnel, thereby enlarging a lateral controller available range.

Moreover, the present invention may be applied to a self-driving vehicle controller which will be developed later.

As described above, according to the embodiments of the present invention, by accurately checking a driving habit of a driver, a start timing for the lateral control of a vehicle associated with autonomous driving is adjusted, and thus, a steering anxiety which the driver feels is removed.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for controlling a vehicle, the apparatus comprising:
   a first trajectory generator configured to generate a trajectory of a first vehicle based on first vehicle driving information input from a first sensor, the first sensor being configured to sense a driving situation of the first vehicle;
   a second trajectory generator configured to generate a trajectory of a second vehicle of peripheral vehicles based on ambient environment information input from a second sensor configured to sense the driving situation of the first vehicle;
   a trajectory load calculator configured to calculate a trajectory load based on a comparison of a trajectory distance with a first value, wherein the trajectory distance is a difference between the trajectory of the second vehicle and the trajectory of the first vehicle;
   a dangerous index manager configured to generate the dangerous driving index, the dangerous driving index corresponding to the calculated trajectory load; and
   a vehicle controller configured to receive the dangerous driving index from the trajectory load calculator, and to control at least one of an engine operation, a braking operation, or a steering operation, in response to the dangerous driving index being higher than a second value.

2. The apparatus of claim 1, further comprising a peripheral vehicle load calculator configured to calculate a peripheral vehicle load based on a number of the peripheral vehicles and lane changing information of the peripheral vehicles.

3. The apparatus of claim 2, wherein the peripheral vehicle load calculator is further configured to divide dangerous sections with respect to the first vehicle based on a time to collision (TTC), and to calculates the peripheral vehicle load based on a number of peripheral vehicles in each of the divided plurality of dangerous sections and the lane changing information.

4. The apparatus of claim 2, wherein the dangerous driving index corresponds to a value obtained by considering the trajectory load and the peripheral vehicle load.

5. The apparatus of claim 1, further comprising a road load calculator configured to calculate a road load based on the at least one of a road shape, a road surface status, or a traffic status.

6. The apparatus of claim 5, wherein the dangerous driving index is based on the trajectory load and the road load.

7. The apparatus of claim 1, further comprising:
   a peripheral vehicle load calculator configured to calculate a peripheral vehicle load based on a number of the peripheral vehicles and lane changing information of the peripheral vehicles; and
   a road load calculator configured to calculate a road load based on the at least one of a road shape, a road surface status, or a traffic status,
   wherein the dangerous driving index is based on the peripheral vehicle load and the road load.

8. A method for controlling a vehicle, the method comprising:
   generating a trajectory of a first vehicle based on driving information of a first vehicle input from a first sensor, the first sensor being configured to sense a driving situation of the first vehicle;
   generating a trajectory of a second vehicle of peripheral vehicles based on ambient environment information input from a second sensor configured to sense the driving situation of the first vehicle;
   calculating a trajectory load based on a comparison result of a trajectory distance and a first value, wherein the trajectory distance is a difference between the trajectory of the second vehicle and the trajectory of the first vehicle;
   generating a dangerous driving index corresponding to the calculated trajectory load; and
   controlling at least one of an engine operation, a braking operation, or a steering operation, in response to the dangerous driving index being higher than a second value.

9. The method of claim 8, further comprising calculating a peripheral vehicle load, based on a number of peripheral vehicles and lane changing information of the peripheral vehicles.

10. The method of claim 9, wherein the calculating of the peripheral vehicle load peripheral comprises:
    dividing a plurality of dangerous sections with respect to the first vehicle, based on a time to collision (TTC); and
    calculating the peripheral vehicle load, based on a number of peripheral vehicles in each of the divided plurality of dangerous sections and the lane changing information.

11. The method of claim 8, further comprising calculating a road load based on the at least one of a road shape, a road surface status, or a traffic status.

12. The method of claim 11, wherein the dangerous driving index is based on the trajectory load and the road load.

13. The apparatus of claim 1, wherein the ambient environment information is generated by a detection section generator configured to detect an optimized section and to recognize an ambient environment in the optimized detection section.

14. The apparatus of claim 13, wherein the section generator further comprises a target tracer configured to distinguish an obstacle based on a detection signal of the obstacle and to generate a track comprising a covariance of an error of the obstacle and a position estimation value of the obstacle.

15. The apparatus of claim 13, wherein the optimized section is based on a probability value at or below a threshold in a Gaussian probability distribution having a residual covariance as a variance, wherein the probability value is a gate probability optimized by a time based Kalman filter.

16. The apparatus of claim 8, wherein the controlling of the at least one of the engine operation, the braking operation, or the steering operation restricts a driving function of the first vehicle.

* * * * *